US011624508B2

(12) United States Patent
Eckhardt et al.

(10) Patent No.: US 11,624,508 B2
(45) Date of Patent: Apr. 11, 2023

(54) METHODS AND APPARATUS TO INDICATE PRESENCE OF A FLAME

(71) Applicant: Weber-Stephen Products LLC, Palatine, IL (US)

(72) Inventors: David Jonathan Eckhardt, Oswego, IL (US); José Ángel Martinez, Franklin Park, IL (US); Kevin James Glennon, Hoffman Estates, IL (US); Victor Mercado, Jr., Berwyn, IL (US)

(73) Assignee: WEBER-STEPHEN PRODUCTS LLC, Palatine, IL (US)

( * ) Notice: Subject to any disclaimer, the term of this patent is extended or adjusted under 35 U.S.C. 154(b) by 164 days.

(21) Appl. No.: 17/144,038

(22) Filed: Jan. 7, 2021

(65) Prior Publication Data
US 2021/0215344 A1 Jul. 15, 2021

Related U.S. Application Data

(60) Provisional application No. 62/959,647, filed on Jan. 10, 2020.

(51) Int. Cl.
*F24C 3/12* (2006.01)
*F23N 5/24* (2006.01)
(Continued)

(52) U.S. Cl.
CPC ............... *F24C 3/126* (2013.01); *A47J 36/32* (2013.01); *A47J 37/0713* (2013.01);
(Continued)

(58) Field of Classification Search
CPC ........ A47J 36/32; A47J 37/0713; F23N 5/242
(Continued)

(56) References Cited

U.S. PATENT DOCUMENTS 3,841,828 A * 10/1974 Cooper .................. B01D 50/00
432/222
5,003,960 A 4/1991 Hanagan
(Continued)

FOREIGN PATENT DOCUMENTS

CN 209235853 8/2019
EP 1818618 5/2019
(Continued)

OTHER PUBLICATIONS

International Bureau, "International Preliminary Report on Patentability," issued in connection with International Patent Application No. PCT/US2021/012549, dated Jul. 12, 2022, 7 pages.
(Continued)

*Primary Examiner* — Vivek K Shirsat
(74) *Attorney, Agent, or Firm* — Hanley, Flight & Zimmerman, LLC

(57) ABSTRACT

Methods and apparatus to indicate presence of a flame are disclosed. An example gas grill includes a burner tube having apertures to emit a fuel for combustion, an ignition element to cause ignition of the fuel emitted from the apertures of the burner tube, a flame sensor to detect the presence of a flame associated with the combustion of the fuel emitted from the apertures of the burner tube, and flame sense circuitry including a flame signal accessor to access a flame sense signal from the flame sensor, and a terminal to output an indication of the presence of the flame, the indication of the presence of the flame output without respect to an open or closed state of a lid of the grill.

13 Claims, 23 Drawing Sheets

(51) Int. Cl.
*A47J 37/07* (2006.01)
*A47J 36/32* (2006.01)
*F23Q 3/00* (2006.01)
*F23Q 7/10* (2006.01)

(52) U.S. Cl.
CPC .......... *F23N 5/242* (2013.01); *F23N 2223/08* (2020.01); *F23N 2229/00* (2020.01); *F23Q 3/008* (2013.01); *F23Q 7/10* (2013.01)

(58) Field of Classification Search
USPC ...................................................... 126/25 B
See application file for complete search history.

(56) References Cited

U.S. PATENT DOCUMENTS

| | | | |
|---|---|---|---|
| 5,033,449 A | 7/1991 | Hanagan |
| 5,333,596 A | 8/1994 | Clifford |
| 5,617,840 A | 8/1997 | Clifford |
| 5,813,394 A | 9/1998 | Clifford |
| 6,116,230 A | 9/2000 | Clifford et al. |
| 6,133,554 A | 10/2000 | Clifford |
| 6,220,854 B1 | 4/2001 | Clifford et al. |
| 6,382,961 B2 | 5/2002 | Clifford et al. |
| 6,663,009 B1 | 12/2003 | Bedetti et al. |
| 6,880,493 B2 | 4/2005 | Clifford |
| 7,798,139 B2 | 9/2010 | Gagas et al. |
| 8,863,734 B2 | 10/2014 | Shaffer |
| 9,480,358 B2 | 11/2016 | Albizuri Landazabal et al. |
| 9,612,019 B2 | 4/2017 | Atalay et al. |
| 9,784,449 B2 | 10/2017 | Margolin |
| 10,022,014 B2 | 7/2018 | Mateos Martin et al. |
| 10,151,493 B2 | 12/2018 | French et al. |
| 10,485,379 B2 | 11/2019 | Bennett et al. |
| 10,830,449 B2 | 11/2020 | French et al. |
| 2010/0132692 A1 | 6/2010 | Shaffer |
| 2015/0348393 A1* | 12/2015 | Margolin ............ G08B 17/125 340/577 |
| 2021/0041107 A1 | 2/2021 | French et al. |

FOREIGN PATENT DOCUMENTS

| | | |
|---|---|---|
| TW | 200532145 | 10/2005 |
| TW | 200739003 | 10/2007 |
| WO | 2018013425 | 1/2018 |

OTHER PUBLICATIONS

Taiwanese Patent Office, "Decision Rejection," issued in connection with Taiwanese Patent Application No. 110100619, dated Aug. 22, 2022, 4 pages (machine translation included).

Taiwanese Patent Office, "First Office Action," issued in connection with Taiwanese Patent Application No. 110100619, dated May 11, 2022, 37 pages (English translation included).

International Searching Authority, "International Search Report and Written Opinion," issued in connection with International Application No. PCT/US2021/012549, dated Apr. 20, 2021, 10 pages.

* cited by examiner

METHODS AND APPARATUS TO INDICATE PRESENCE OF A FLAME

RELATED APPLICATION

This patent claims the benefit of U.S. Provisional Patent Application No. 62/959,647, which was filed on Jan. 10, 2020. U.S. Provisional Patent Application No. 62/959,647 is hereby incorporated herein by reference in its entirety. Priority to U.S. Patent Application No. 62/959,647 is hereby claimed.

FIELD OF THE DISCLOSURE

This disclosure relates generally to grills, and, more particularly, to methods and apparatus to indicate presence of a flame.

BACKGROUND

Gas grill systems operate by emitting a fuel (e.g., natural gas, propane, etc.) through one or more orifices for combustion. Valves are used to control an amount of fuel emitted for combustion. The combustion of the fuel results in fire and/or an increased temperature that is useful for cooking food.

Figure 1:
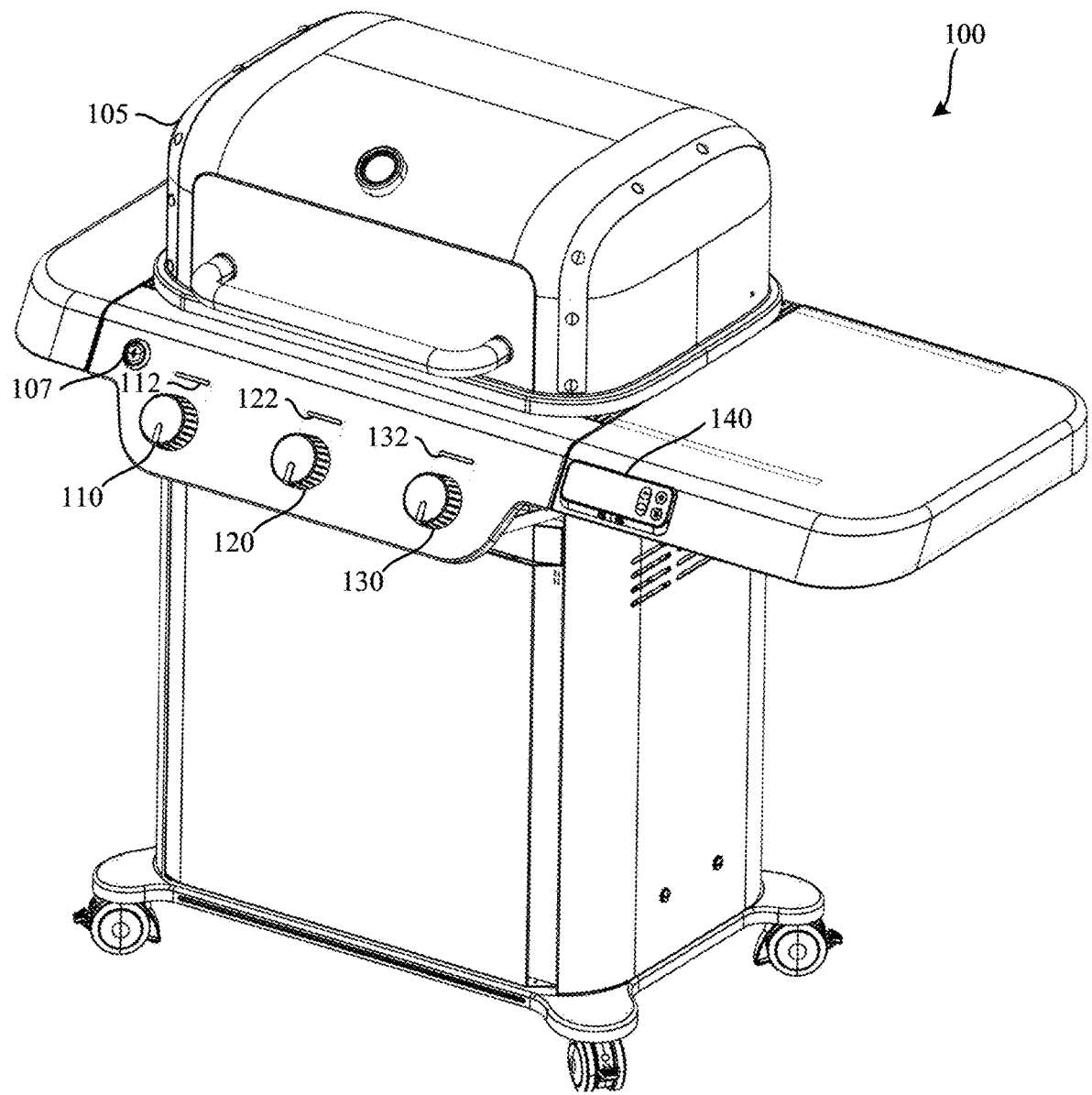
FIG. 1 is a perspective view of an example gas grill constructed in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In

DETAILED DESCRIPTION

Gas grill systems operate by emitting a fuel (e.g., natural gas, propane, etc.) through one or more orifices for combustion, which results in fire and/or an increased temperature that is useful for cooking food. However, in some cases, the fuel may be emitted through the one or more orifices without being combusted. In some examples, a user of the grill may be unaware of the status of the flame (e.g., the combustion of the fuel) without opening the lid. This makes it difficult for users to identify, when lighting the grill, whether the grill is lit without opening the lid of the grill and visually inspecting a burner to identify whether a flame is present. Moreover, some users are intimidated by grilling due to the nature of working with a flammable fuel, and would prefer to be able to know if the grill is lit without opening the lid.

In some examples, the flame may become extinguished (e.g., due to wind), causing the grill to need to be re-lit. Users may be unaware of the flame being extinguished for some time, particularly if the only way to detect the extinguished condition is to open the lid and check for a flame. In some cases, this may present an undesirable and/or dangerous situation, where fuel is being emitted into a cooking area (e.g., an internal chamber of the grill) without being combusted.

Example approaches disclosed herein utilize a flame sensing system and an external indicator to reliably indicate to a user whether a flame is present. In some examples, individual indicators are provided for each burner, enabling the user to know the status of each individual burner. In some examples, the example flame sensing system is used to additionally or alternatively indicate a temperature of an element of the grill. In this manner, the flame sensing system can be used to indicate to a user whether an element (e.g., the grill grates, the burner, etc.) is hot (e.g., when a temperature of the element exceeds a temperature threshold).

FIG. 1 is a perspective view of an example gas grill 100 constructed in accordance with teachings of this disclosure. The example grill 100 includes a lid 105, an igniter button 107, knobs 110, 120, 130, external indicators 112, 122, 132, and a control panel 140.

The example lid 105 of the illustrated example of FIG. 1 forms an enclosure around a cooking area. In the illustrated example of FIG. 1, the lid 105 is shown in a closed state. In the closed state, users cannot visually see and/or inspect burners within the cooking area. As a result, users cannot visually determine whether a flame is present (e.g., during initial ignition of the grill and/or during a cook) without opening the lid. In the illustrated example of FIG. 1, the lid is opened by rotating the lid upward about a hinge at the back of the lid. However, any other approach for opening the lid (e.g., lifting the lid entirely off of the grill) may additionally or alternatively be used.

The example igniter button 107 of the illustrated example of FIG. 1 enables one or more igniters to output power to an ignition element, causing ignition of fuel emitted from burner tubes of the grill. In some examples, the ignition element is implemented as a spark electrode. In such an example, the voltage applied to the spark electrode causes creation of a spark to ignite the fuel. In some other examples, a hot surface ignitor is used. In such an example, the voltage applied to the hot surface ignitor causes a surface of the ignitor to heat up to a temperature that causes combustion of the fuel. While examples disclosed throughout this application refer to the use of a spark electrode, a hot surface ignitor may be utilized in place of a spark electrode.

In the illustrated example of FIG. 1, the igniter button 107 is implemented using a push button that is enabled while the push button is depressed. However, any other type of input device activated in any other manner may additionally or alternatively be used. Moreover, while in the illustrated example of FIG. 1, a single igniter button 107 is shown, in some examples, separate igniter buttons may be used corresponding to each burner. Further, in some examples, the ignitor button 107 may be omitted and the ignition may be controlled by, for example, a controller (e.g., a microprocessor or other electronic component).

Figure 2A:
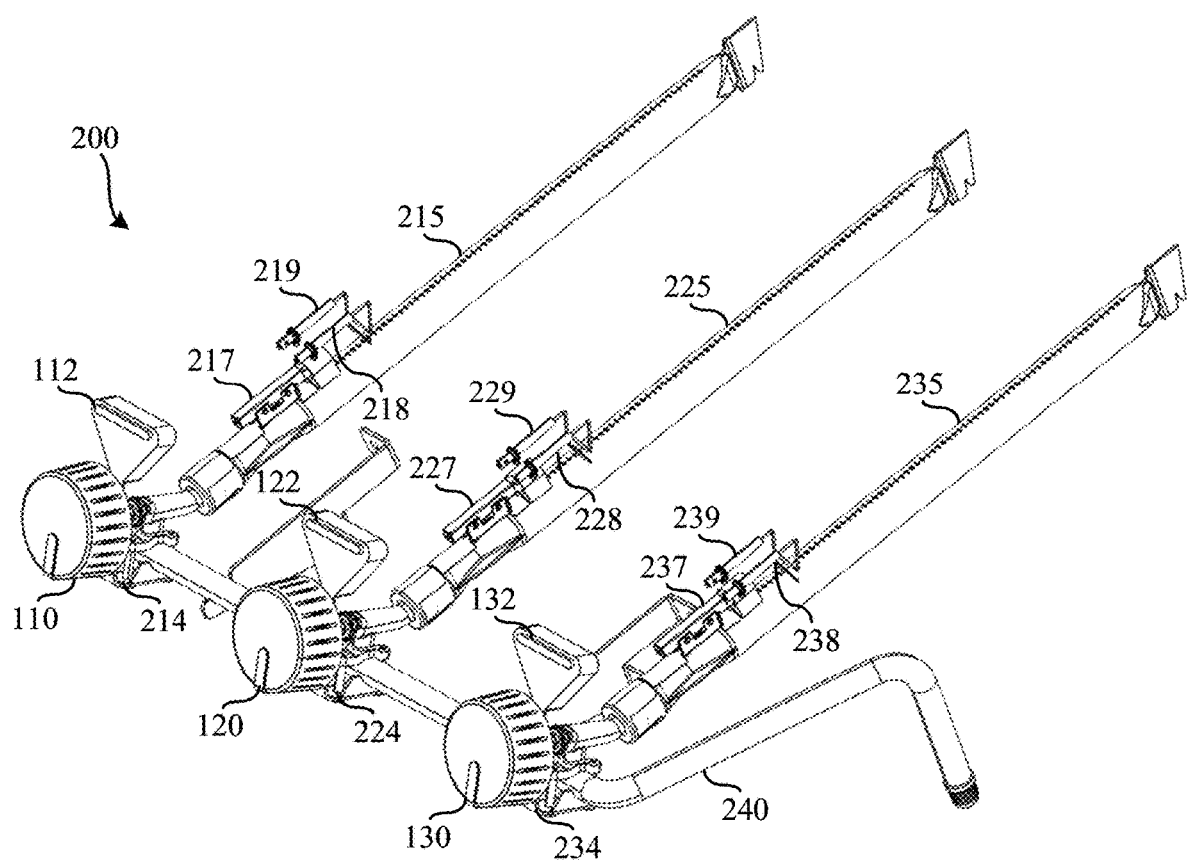
FIG. 2A is a perspective view of a cooking system of the gas grill of FIG. 1, including flame indicators and flame sensors.

The example knobs 110, 120, 130 of the illustrated example of FIG. 1 are rotary knobs that are used to turn valves that control the amount of fuel emitted by the respective burner tubes 215, 225, 235 of FIG. 2A. For example, rotating the knob 110 clockwise results in increased amounts of fuel being emitted by the burner 215. However, any other type of input device may additionally or alternatively be used (e.g., a slider, a digital input device, a switch, etc.). In some examples, rather than directly turning valves that control the amount of fuel emitted by the respective burner tube, the example knobs may be used as input devices that send a signal to a central controller (e.g., a microcontroller or other electronic component) that electronically controls the valves.

The example flame indicators 112, 122, 132 of the illustrated example of FIG. 1 enable a visual indication of whether a flame is present to be provided to a user of the grill 100. In examples disclosed herein, the flame indicators 112, 122, 132 are implemented using a light pipe mounted to a PCB which helps locate the module on the front control panel of the grill 100. Mounting hardware to position the flame indicator(s) 112, 122, 132 is hidden behind the knob(s) 110, 120, 130. In examples disclosed herein, a light emitting diode (LED) (and/or any other light source) illuminates the light pipe upon sensing of DC flame conduction. In examples disclosed herein, the flame indicator 112, 122, 132 and/or flame detection circuitry associated with the flame indicator 112, 122, 132 is constantly detecting the presence of a flame and providing an indication of the presence of the flame, as long as sufficient battery power is supplied. This allows the grill user to be aware of the burner status without opening the lid. Additionally or alternatively, the detection of the presence of the flame may be performed periodically, to conserve battery power. Such periodic sensing may be performed relatively quickly (e.g., every second, every tenth of a second, etc.) to enable a quick response time for indication of the presence of the flame, while conserving energy.

The example control panel 140 of the illustrated example of FIG. 1 includes display elements that enable a user to interact with the grill 100. For example, temperature readings (e.g., from temperature probes used in the grill) may be displayed on a display of the control panel 140. In some examples, indications of whether a flame is present may be displayed on the control panel 140 (e.g., in addition to and/or in lieu of the flame indicators 112, 122, 132). In some examples, the control panel 140 enables a user to provide input to the grill 100 to, for example, set desired temperatures of the cooking process, control ignition of a flame, etc.

In the illustrated example of FIG. 1, three knobs 110, 120, 130 and three flame indicators 112, 122, 132 corresponding to three burner tubes are shown. However, any number and/or combination of knobs, flame indicators, and/or burner tubes may be used. For example, the grill 100 may use four burner tubes and four corresponding knobs and flame indicators. In some examples, a single flame indicator may be used for all of the burner tubes.

FIG. 2A is a perspective view of a cooking system 200 of the gas grill of FIG. 1. The example cooking system 200 includes the knobs 110, 120, 130, the flame indicators 112, 122, 132, valves 214, 224, 234, burner tubes 215, 225, 235, spark electrodes 217, 227, 237, and flame sensors 218, 219, 228, 229, 238, 239.

The example valves 214, 224, 234 of the illustrated example of FIG. 2A connect a main fuel line 240 to each of the corresponding burner tubes 215, 225, 235. Each of the valves 214, 224, 234 are controlled into an open position, a closed position, or a position intermediate the open position and the closed position by their corresponding knob 110, 120, 130. In some examples, the position of the valves may be electronically controlled by a central controller.

The example burner tubes 215, 225, 235 of the illustrated example of FIG. 2A are metal tubes that include apertures that emit fuel (e.g., gas) into the cooking area for ignition and combustion. In the illustrated example of FIG. 2A, the apertures are positioned along the top of the burner tubes. However, the apertures may be positioned in any other location and/or orientation. Fuel is supplied to the burner tubes 215, 225, 235 by way of the valves 214, 224, 234 (e.g., based on the position of the corresponding knob 110, 120, 130).

In the illustrated example of FIG. 2A, three burner tubes 215, 225, 235 are shown. However, any number of burner tubes may additionally or alternatively be used. Moreover, while in the illustrated example of FIG. 2A, the burner tubes 215, 225, 235 are oriented in a front-to-back configuration, any other past, present, and/or future burner tube configuration may additionally or alternatively be used such as, for example, a side-to-side configuration. In some examples, additional burner tubes may be used for different types of cooking such as, for example, searing.

The example spark electrodes 217, 227, 237 of the illustrated example of FIG. 2A are implemented using conductive electrodes that function as a spark plug to create a spark. In examples disclosed herein, the spark electrodes 217, 227, 237 are placed directly in the path of the fuel being emitted from the burner tubes 215, 225, 235. The spark electrode 217, 227, 237 produces a spark (e.g., typically at a rate of two to four sparks per second) that causes ignition of the fuel emitted from the burner tubes 215, 225, 235. While in examples disclosed herein, spark electrodes are used to create a spark, any other type of ignition element may additionally or alternatively be used. For example, a hot surface ignitor may be used in lieu of a spark electrode. A hot surface ignitor is an ignitor that emits heat when a voltage is applied, causing combustion of fuel emitted from the nearby burner tube. In some examples, multiple different types of ignition elements may be used in a same grill. For example, different ignition elements may be used for different burner tubes and/or burner tube types, multiple ignition elements may be used in connection with a particular burner tube, etc.

The example flame sensors 218, 219, 228, 229, 239, 239 of the illustrated example of FIG. 2A sense a flame emitted from the burner tubes 215, 225, 235. In examples disclosed herein, the flame sensors 218, 219, 228, 229, 239, 239 are implemented using Kanthal® rods. However, any other sensor may additionally or alternatively be used. For example, the flame sensors may be implemented using any other metallic and/or conductive material including, for example, stainless steel, a mixed metal oxide, etc. In the illustrated example of FIG. 2A, the flame sensors include a rod having two ninety degree bends. The ninety degree bends enable a portion of the flame sensor rod to be in close physical proximity to the burner tube(s) (e.g., in close proximity to an expected location of a flame), and also enable a mounting point of the flame sensors 218, 219, 228, 229, 239, 239 to be away from the expected location of the flame. Such an approach enables high heat (e.g., a flame) to be detected, while moving the mounting point of the flame sensor away from the expected location of the flame, thereby extending the expected lifespan of the flame sensor.

In the illustrated example of FIG. 2A, two flame sensors are shown in association with each burner tube. Each flame sensor of FIG. 2A includes a single rod for sensing the presence of the flame. However, in some examples, a single flame sensor (e.g., a flame sensor module) having multiple rods may additionally or alternatively be used. Further, different flame sensor modules and/or flame sensor module configurations may be used in association with each different burner. Such an approach enables different types of sensing to be performed in association with different burners. For example, a "high heat" burner (e.g., a burner intended for searing food) may utilize a different flame sensor module configuration that includes three or more flame rods oriented to enable detection of a size of the flame.

In some examples, the burner may be a "side burner" and may be mounted to the side of the grill 100 to enable a user to heat a pot and/or other cooking vessel outside of the cooking area (e.g., under the lid). In such an example, the flame sensor may be positioned in an expected location of the flame of the side burner.

In examples disclosed herein, a flame is sensed using a low current DC voltage on a Kanthal® rod to minimize power consumption. In some examples, the burner tube(s) 215, 225, 235 are grounded. As a result, when a flame is present, there is a conductive path from the flame sensor(s) 218, 219, 228, 229, 239, 239 to the corresponding burner tube 215, 225, 235.

In examples disclosed herein, the flame detection system is separate from the ignition system to eliminate interference from the ignitor and/or spark electrode. This also allows for simplification of the harnessing for the production process. An example harness is described in further detail below in connection with FIGS. 3, 4, 5, and/or 6.

In the illustrated example of FIG. 2A, two flame sensors are shown for each burner tube. As described below in connection with FIG. 13, such a configuration enables measurement of the voltage across the two flame sensors, as opposed to across the flame sensor and the chassis (and/or burner tube). This also allows the flame sensing to be electrically isolated from the spark electrode and/or ignition system, which can cause unwanted electrical noise (e.g., when attempting to both ignite the flame and sense the presence of the flame at nearly simultaneous times). However, any number of flame sensors may be used for each burner tube (e.g., a single flame sensor may be used in association with each burner tube, three flame sensors may be used in association with each burner tube, etc.). Using a single flame sensor, while reducing manufacturing costs associated with additional flame sensors, requires the sensed path be between the flame sensor and a grounding location, which may be implemented using a burner tube, a chassis of the grill, another electrode, an ignition element (e.g., a spark electrode). Such an approach likewise drives additional electrical noise and/or grounding considerations, as the spark ignitors are likely utilize a similar grounding path through the burner tube and/or chassis.

Figure 2B:
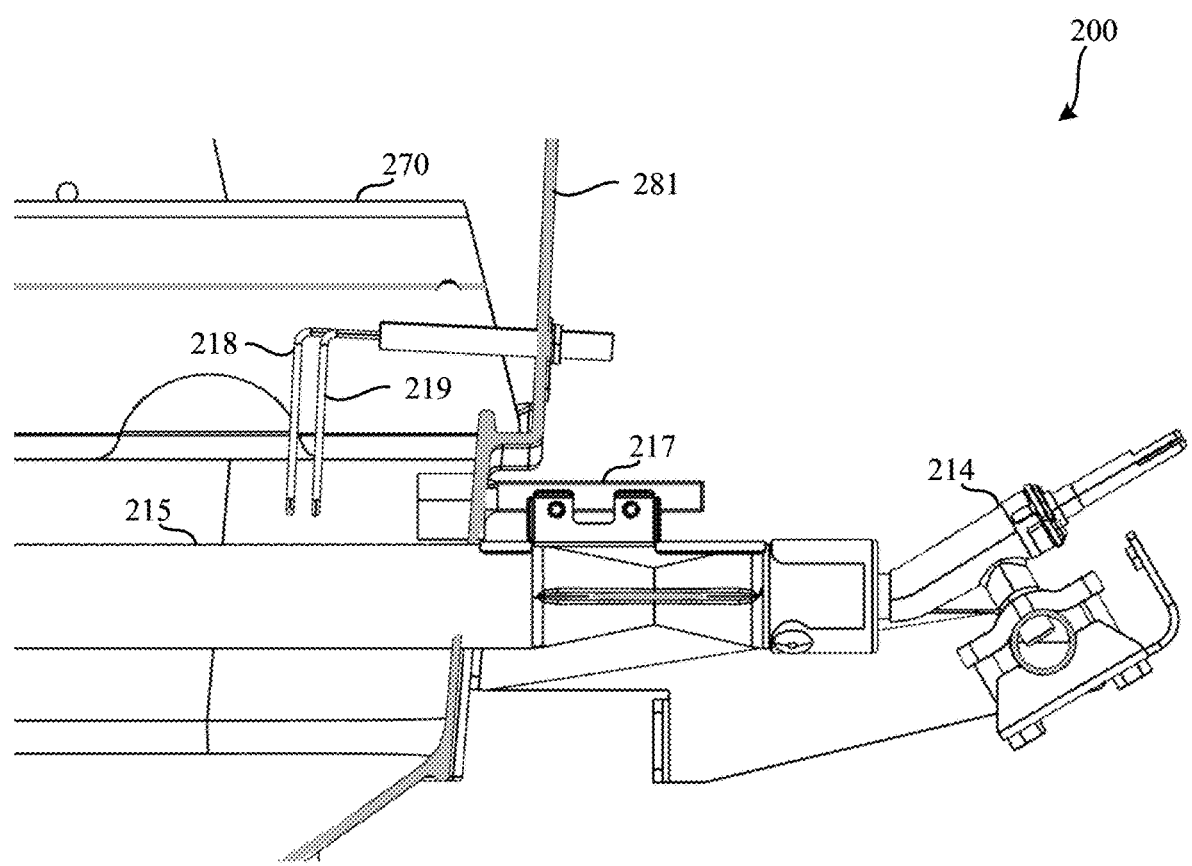
FIG. 2B is a side view of the cooking system of FIG. 2A, illustrating a placement of the flame sensors with respect to a flavorizer bar.

FIG. 2B is a side view of the cooking system 200 of FIG. 2A, illustrating a placement of the flame sensors 218, 219 with respect to a flavorizer bar 270. In the illustrated example of FIG. 2B, the flame sensors 218, 219 are affixed to a chassis 281 of the grill. The example chassis 281 of the illustrated example of FIG. 2B surrounds the cooking area and provides mounting locations for components such as the burner tube 215 and the flame sensors 218, 219.

The example flavorizer bar 270 of the illustrated example of FIG. 2B is an angled piece of metal that is located above a corresponding burner tube 215, 225, 235. The flavorizer bar 270 helps add a "cooked on a grill" flavor to the food that is cooked on the grill 100. Drippings, marinades and juices from food being cooked above the flavorizer bar 270 fall down onto the hot flavorizer bar 270, are vaporized, and circulate back up to the food, imparting additional flavor to the food. As an added advantage, the flavorizer bar 270 guards the burner tube 215 and the flame sensor(s) 218, 219 from drippings from the cooked food which might otherwise interfere with the flame sensor(s) ability to accurately sense the presence of a flame.

Figure 2C:
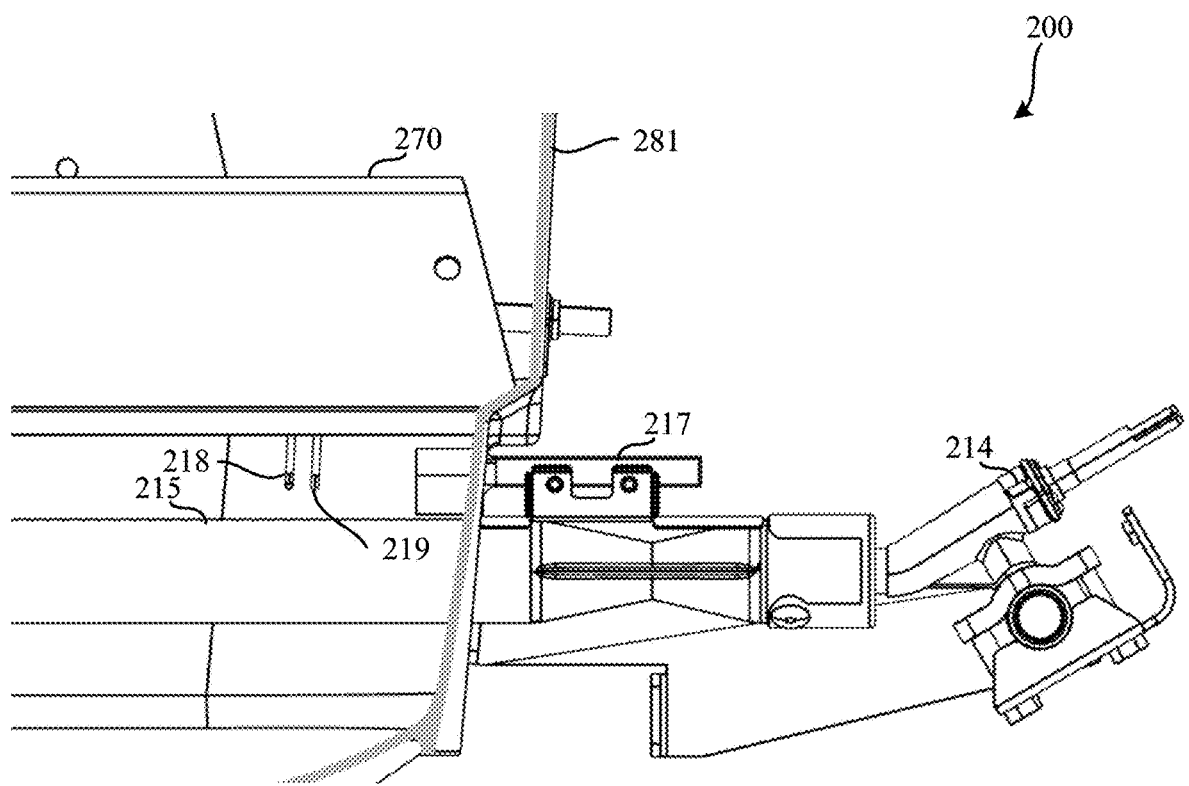
FIG. 2C is a side view of the cooking system of FIG. 2A, showing the flame sensors partially occluded by the flavorizer bar.

FIG. 2C is a side view of the cooking system 200 of FIG. 2A, showing the flame sensors partially occluded by the flavorizer bar 270. In the illustrated example of FIG. 2C, bottom portions of the flame sensors 218, 219 are shown extended below the bottom edge of the flavorizer bar 270. In some examples, the bottom portions of the flame sensors 218, 219 may be elevated to a point above the bottom edge of the flavorizer bar 270.

Figure 2D:
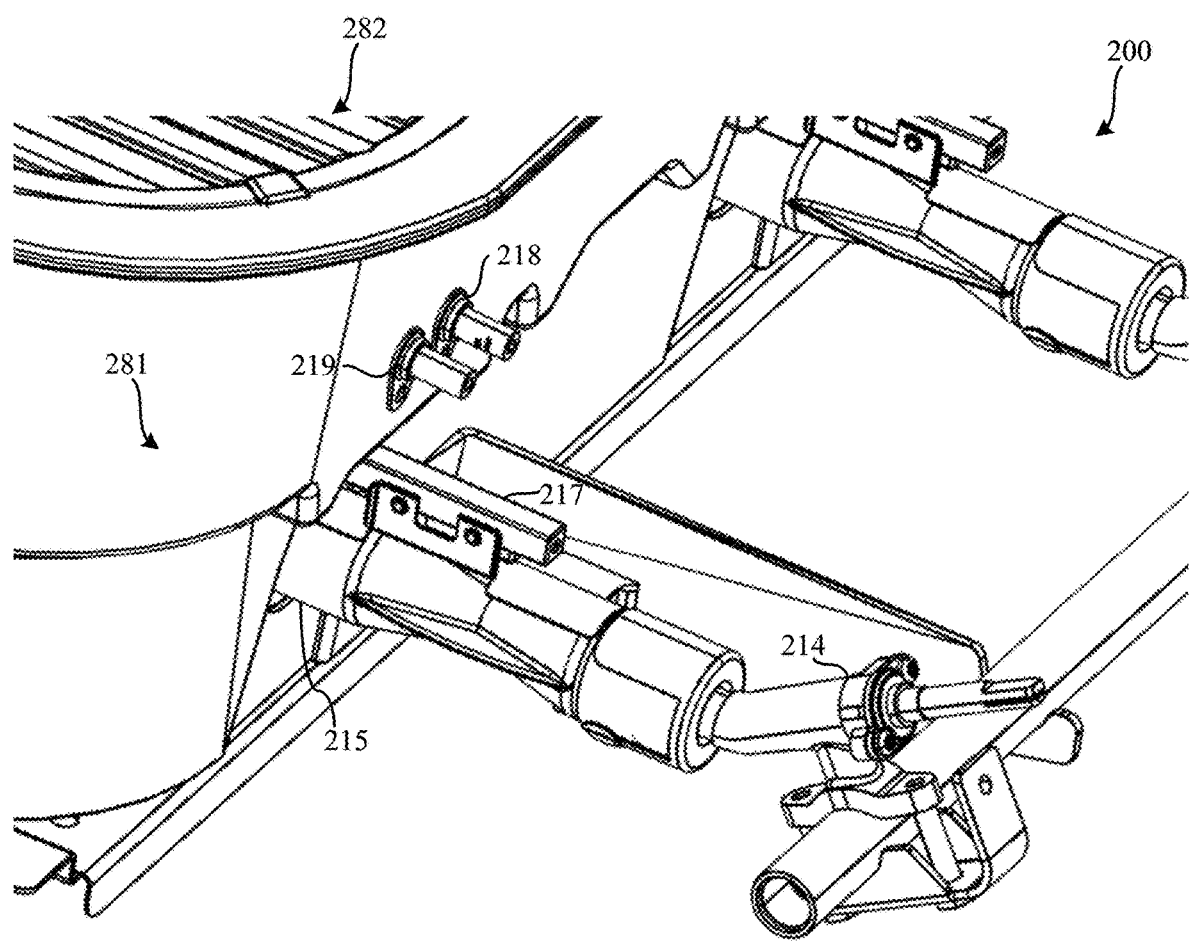
FIG. 2D is a perspective view of the cooking system of the gas grill of FIG. 1.

FIG. 2D is a perspective view of the cooking system 200 of FIG. 2A. In the illustrated example of FIG. 2D, the flame sensors 218, 219 are attached to the chassis 281 in parallel with respect to a top of the chassis (e.g., a plane on which grill grates 282 are affixed). However, the flame sensors 218, 219 may be affixed in any orientation. Moreover, in some examples, a single flame sensor 218 may be used in association with each burner, instead of the two flame sensor configuration depicted in FIG. 2D.

Figure 3:
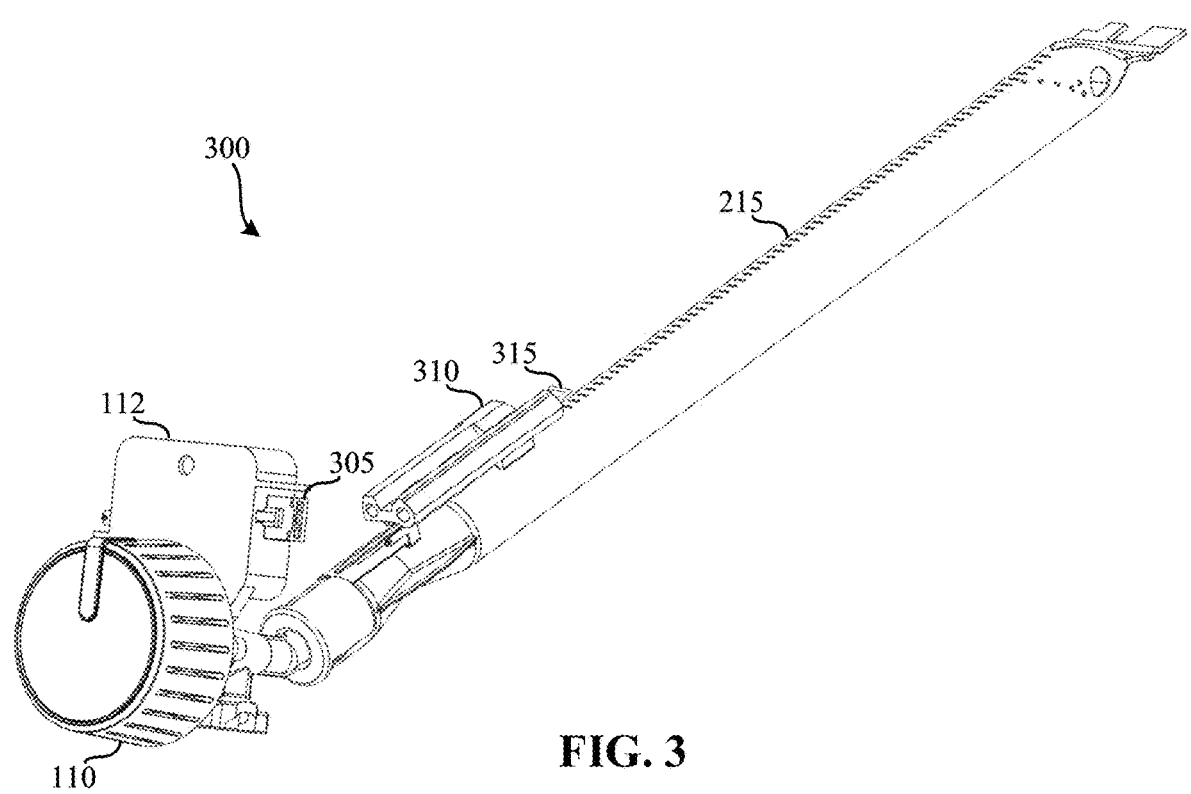
FIG. 3 is a perspective view of an example cooking system using a ceramic harness to support a flame sensor and an ignitor.

FIG. 3 is a perspective view of an example cooking system 300 using a ceramic harness 310 to support a flame sensor 315 and a spark electrode. The example cooking system 300 includes the knob 110, the flame indicator 112, the burner tube 215, a daisy chain header 305, the ceramic harness 310, and the flame sensor 315.

In the illustrated example of FIG. 3, the flame indicator 112 includes an opening that enables use of a single light emitting diode (LED) to indicate the presence of a flame from the burner tube 215. The example flame indicator 112 includes the daisy chain header 305, which enables the flame indicator 112 to receive power and/or communicate with a central controller (e.g., to indicate the presence of the flame.)

The example ceramic harness 310 of the illustrated example of FIG. 3 is used to support the flame sensor 315 and the spark electrode (occluded from view in FIG. 3). In this manner, the ceramic harness 310 positions the flame sensor 315 at a location where a flame is expected (e.g., over the apertures of the burner tube 215). Additionally, the flame sensor 315 of FIG. 3 is bent such that a tip of the flame sensor 315 is positioned over the apertures of the burner tube. While in the illustrated example of FIG. 3, a single ninety degree bend is shown, in some examples, multiple bends may be used and/or varying angles of bend may be used. Different amounts of bend in the flame sensor 315 will position the tip of the flame sensor 315 in different locations, which may affect the ability of flames to conduct an electrical current between the flame rod and the burner tube. In this manner, the amount of resistance to be measured across the flame sensor to ground can be controlled.

Moreover, the ceramic harness 310 positions the spark electrode at a location where a spark formed between the spark electrode and the burner tube 215 is likely to ignite fuel emitted from the apertures of the burner tube 215. In some examples, the spark is to be formed between the spark electrode and the flame sensor. In such an example, it may be advantageous to have the flame sensor bent in a manner such that at least a portion of the flame rod is in close proximity of the spark electrode.

In the illustrated example of FIG. 3, the ceramic harness 310 is made of a ceramic material. In particular, the ceramic material is used due to its heat resistance as well as its electrical insulation properties. In this manner, the ceramic harness does not break and/or become deformed when exposed to heat in the vicinity of the flames. Additionally, the ceramic material provides electrical insulation and/or isolation between the flame sensor 315 and the spark electrode.

Figure 4:
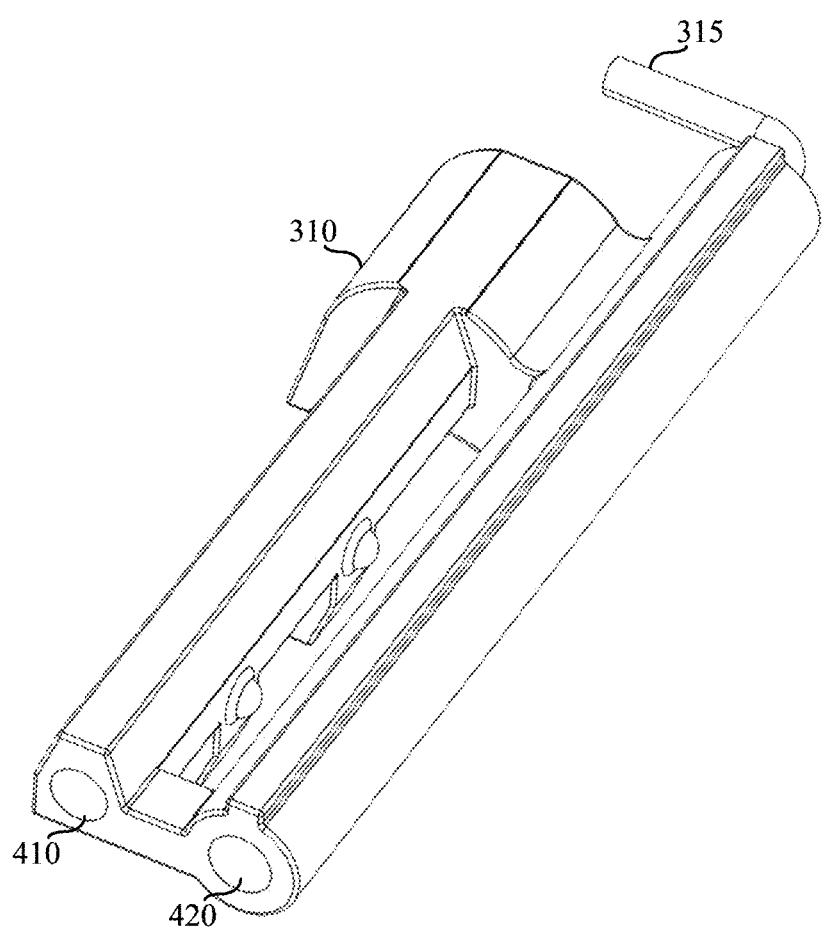
FIG. 4 is a perspective view of the example ceramic harness of FIG. 3.

FIG. 4 is a perspective view of the example ceramic harness 310 of FIG. 3. In the illustrated example of FIG. 4, a first channel 410 and a second channel 420 of the ceramic harness 310 are shown. The first channel 410 allows the ceramic harness 310 to receive the spark electrode, while the second channel 420 allows the ceramic harness 310 to receive the flame sensor 315. In examples disclosed herein, the flame sensor 315 is inserted into the second channel 420, and the tip of the flame sensor 315 is then bent to allow the tip to be placed over the apertures of the burner tube.

Figure 5:
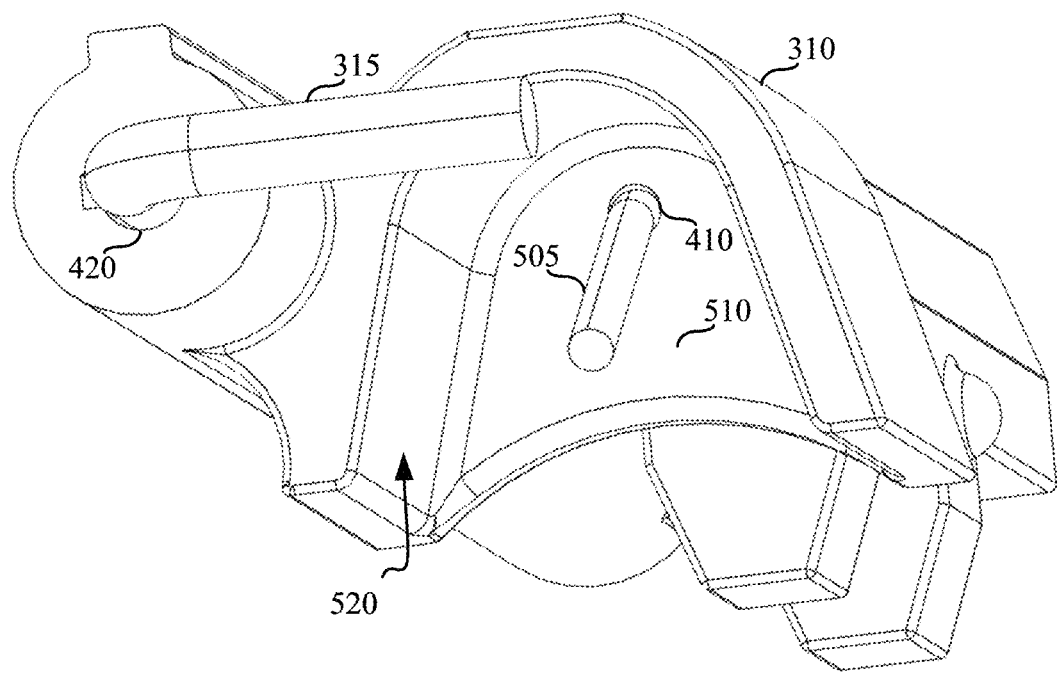
FIG. 5 is an alternate view of the example ceramic harness of FIGS. 3 and/or 4.

FIG. 5 is an alternate view of the example ceramic harness of FIGS. 3 and/or 4. While the example view of FIG. 4 shows first ends of the first channel 410 and the second channel 420, the example view of FIG. 5 shows second ends of the first channel 410 and the second channel 420. In the illustrated example of FIG. 5, a spark electrode 505 is inserted into the first channel 410 and protrudes past a first surface 510 of the ceramic harness 310 into a cavity 520 formed by the ceramic harness 310. The example spark electrode 505 is then bent towards the burner tube to reduce the distance between the spark electrode 505 and the burner tube. When the ceramic harness 310 is installed over the apertures of a burner tube, the cavity 520 is positioned over the apertures of the burner tube. In this manner, when a valve is opened and fuel is emitted from the apertures, the fuel will collect in the cavity 520, increasing the likelihood of combustion when the spark electrode is used to create a spark.

The illustrated example of FIG. 5 additionally shows a bend in the flame sensor 315, which allows at least a portion of the flame sensor 315 to be positioned over the corresponding burner tube (e.g., a location where a flame is to be expected). In the illustrated example of FIG. 5, the bend is approximately ninety degrees. However, any amount of bend may additionally or alternatively be used.

Figure 6:
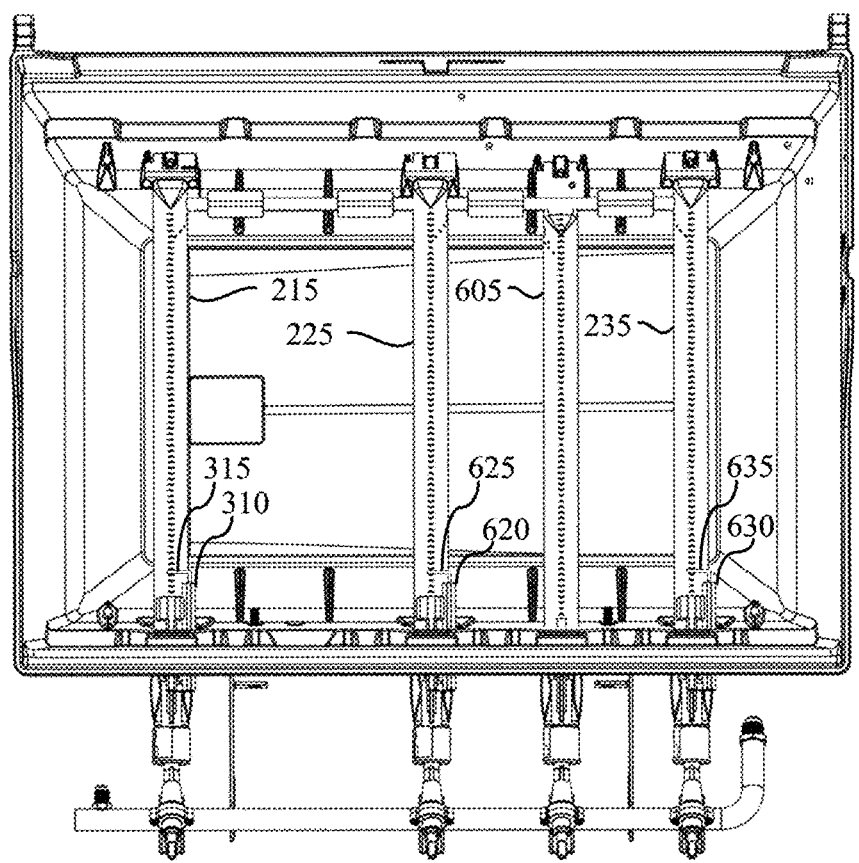
FIG. 6 is a top view of an example gas grill illustrating placement of ceramic harnesses and flame sensors with respect to corresponding burner tubes of the example gas grill.

FIG. 6 is a top view of an example gas grill illustrating placement of ceramic harnesses 310, 620, 630 and flame sensors 315, 625, 635 with respect to corresponding burner tubes 215, 225, 235 of the example gas grill. In the illustrated example of FIG. 6, an additional burner tube 605 is shown. In examples disclosed herein, the additional burner tube 605 is used for searing food. Because the additional burner tube is not used during a normal cooking process, but is instead used in a cooking process where the user is more likely to have the lid of the grill open and be using the burner tube 605 at a same time as at least one of the other burner tubes, no spark electrode and flame sensor are used in connection with the additional burner tube 605. However, in some examples, a flame sensor, a spark electrode, and a ceramic harness may be used in connection with the additional burner tube 605.

Figure 7:
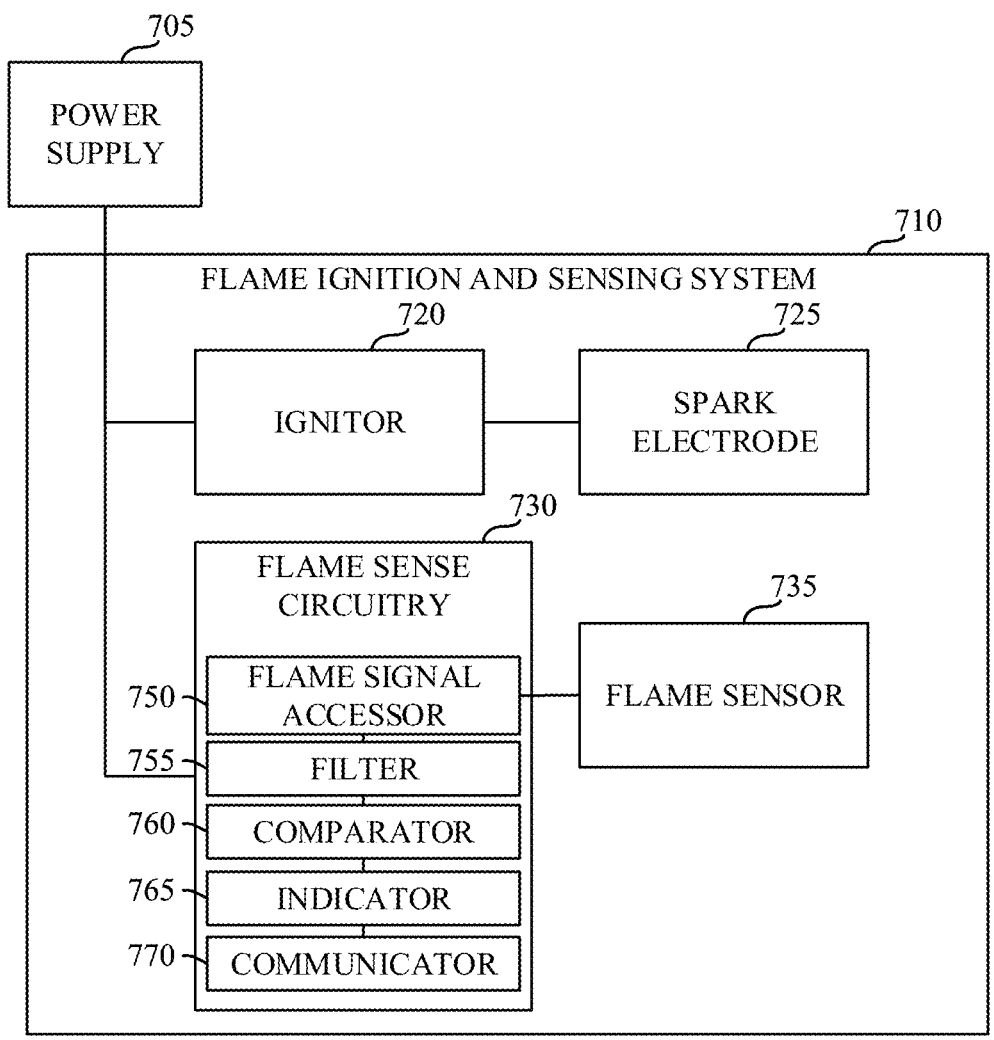
FIG. 7 is a block diagram of an example flame ignition and sensing system.

FIG. 7 is a block diagram of an example flame ignition and sensing system 710. The example flame ignition and sensing system 710 receives power from a power supply 705. The example flame ignition and sensing system 710 of FIG. 7 includes an ignitor 720, a spark electrode 725, flame sense circuitry 730, and a flame sensor 735.

The example power supply 705 of the illustrated example of FIG. 7 is implemented by a battery. However, any other type of power supply may additionally or alternatively be used. For example, a DC power supply (e.g., receiving AC power from a mains circuit) may be used to supply power to the flame ignition and sensing system 710.

The example ignitor 720 of the illustrated example of FIG. 7 receives an input from the power supply 705, and outputs a high voltage between two output terminals. In examples disclosed herein, at least one of the output terminals are connected to the spark electrode 725, and result in the spark electrode 725 emitting a spark. In some examples, the ignitor 720 is selectively enabled via, for example, an input pin and/or a switch. In some examples, the ignitor 720 is referred to as an ignitor circuit. In some examples, the ignitor 720 implements means for igniting.

The example spark electrode 725 of the illustrated example of FIG. 7 corresponds to the spark electrodes 217, 227, 237 of FIG. 2A. The example spark electrode 725 is implemented using a conductive electrode that functions as a spark plug to create a spark. In examples disclosed herein, the spark electrode 725 is placed directly in the path of the fuel being emitted from a corresponding burner tube. The spark electrode 725 produces a spark (e.g., typically at a rate of two to four sparks per second) that causes ignition of the fuel emitted from the corresponding burner tube. While in examples disclosed herein, a spark electrode is used to create a spark, any other type of fuel ignition system may additionally or alternatively be used.

The example flame sense circuitry 730 of the illustrated example of FIG. 7 includes a flame signal accessor 750, a filter 755, a comparator 760, an indicator 765, and a communicator 770. The example flame sense circuitry 730 interfaces with the flame sensor 735 to detect whether a flame is present, and provide an indication of whether the flame is present.

The example flame sensor 735 of the illustrated example of FIG. 7 senses a flame emitted from a burner tubes. In examples disclosed herein, the flame sensor 735 is implemented using a Kanthal® rod. However, the flame sensor 735 may be implemented using any other metallic and/or conductive material including, for example, stainless steel, a mixed metal oxide, etc. However, any other sensor may additionally or alternatively be used. In some examples, the example flame sensor 735 is implemented using a rod having two or more ninety degree bends. The ninety degree bends enable a portion of the flame sensor rod to be positioned in close physical proximity to the burner tube(s) (e.g., in close proximity to an expected location of a flame), and also enable a mounting point of the flame sensor to be away from the expected location of the flame (e.g., attached to a housing of the grill as shown in FIG. 2D, supported by a ceramic harness as shown in FIG. 3). Such an approach enables high heat (e.g., a flame) to be detected, while moving the mounting point of the flame sensor away from the expected location of the flame, thereby extending the expected lifespan of the flame sensor. However, the rod of the flame sensor 735 may be bent and/or oriented in any other configuration.

The example flame signal accessor 750 of the illustrated example of FIG. 7 is an input device that measures a voltage across the flame sensor 735 and the chassis of the grill (and/or across multiple flame sensors 735). In some examples, the flame signal accessor 750 is implemented using an analog to digital (A2D) converter to enable representation of the voltage in a digital format. In some examples, the flame signal accessor 750 includes one or more amplifiers to amplify the sensed voltage and enable a more accurate comparison of the sensed voltage to a threshold voltage (e.g., by the comparator 760, below). In examples disclosed herein, the flame signal accessor 750 implements means for accessing.

The example filter 755 of the illustrated example of FIG. 7 removes noise from the sensed voltage signal. In examples disclosed herein, the filter 755 is implemented using a low pass filter that removes high frequency noise (e.g., noise associated with the ignitor and/or spark electrode). Using a low pass filter additionally has the benefit of filtering the effects of wind on the sensed voltage. However, any other type of filter may additionally or alternatively be used. In some examples, the filter 755 is implemented using analog electronics such as, for example, a RLC circuit. In some examples, multiple filters may be used to, for example, enable a flame to be identified more quickly, but the loss of a flame signal (e.g., a falling edge) to have a time delay to mitigate the effects of wind on the detection of the flame. In examples disclosed herein, the filter 755 implements means for filtering.

The example comparator 760 of the illustrated example of FIG. 7 compares the filtered signal output by the filter 755 to a threshold to determine whether a flame is sensed. In examples disclosed herein, the threshold is a voltage representative of whether a flame is sensed by the flame sensor. In examples disclosed herein, the comparator 760 is an analog comparator. However, in some examples, the comparator 760 may be implemented using a digital logic circuit. Moreover, in some examples, the comparator may be implemented using one or more programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). In this manner, the comparator 760 may be implemented using machine readable instructions to cause a hardware logic circuit (e.g., a microcontroller) to perform a comparison. Furthermore, in some examples, additional components of the example flame sense circuitry 730 may be implemented using the logic circuit that implements the example comparator 760. In examples disclosed herein, the comparator 760 implements means for comparing.

The example indicator 765 of the illustrated example of FIG. 7 is implemented using a light emitting diode (LED) that is illuminated based on the output of the comparator 760. That is, when the filtered signal output by the filter 755 meets or exceeds the threshold, the indicator 765 is enabled. Conversely, when the filtered signal output by the filter does not meet or exceed the threshold, the indicator 765 is disabled. Moreover, while the indicator 765 of the illustrated example of FIG. 7 is implemented using a LED, any other past, present, and/or future devices may additionally or alternatively be used to indicate the presence of a flame. In examples disclosed herein, the indicator 765 implements means for indicating.

The example communicator 770 of the illustrated example of FIG. 7 is implemented using an output pin to indicate to a central controller whether a flame is sensed. Providing an indication of the presence of the flame to the central controller enables the central controller to provide additional indications and/or perform additional actions based on the presence of the flame. For example, the central controller may attempt to re-ignite the flame in the event that the flame is extinguished (but is still desired). In some examples, the flame signal may be communicated to the central controller by the example communicator 770 using a binary logic level (e.g., a transistor-transistor logic (TTL) voltage level). However, any other past, present, and/or future approach to communicating a value to a controller may additionally or alternatively be used such as, for example, a serial bus, an inter-integrated circuit (I²C) bus, etc. In examples disclosed herein, the communicator 770 implements means for communicating.

In some examples, either the indicator 765 or the communicator 770 may be omitted. In an example where the indicator 765 is omitted, the visual indication of whether the flame is present may be provided by a central controller based on the output of the communicator 770. In implementations where there is no central controller, the communicator 770 may be omitted.

Figure 8:
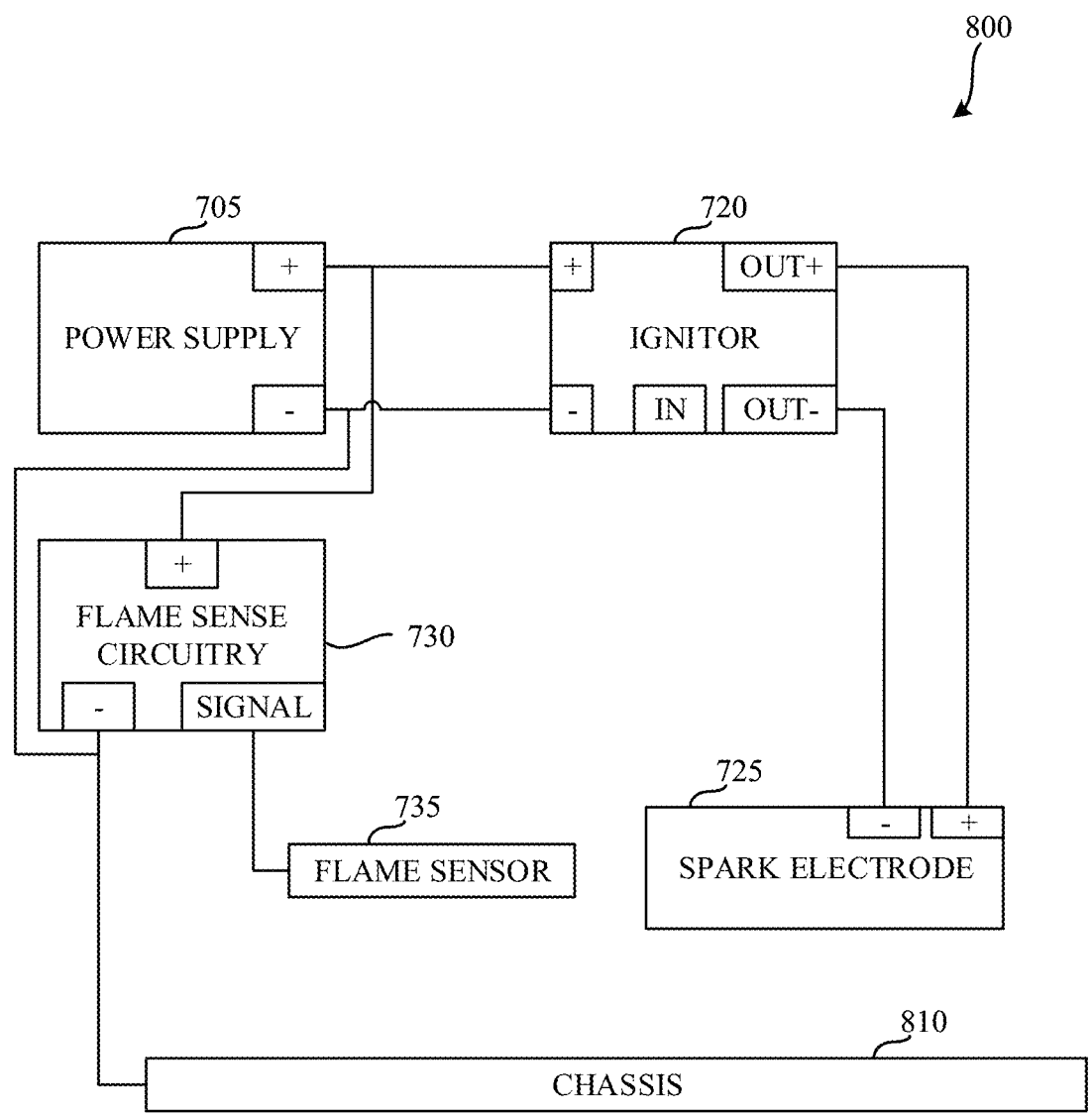
FIG. 8 is a block diagram of an example configuration of the flame ignition and sensing system of FIG. 7 having an isolated ignitor.

FIG. 8 is a block diagram of an example configuration 800 of the flame ignition and sensing system of FIG. 7 having an isolated ignitor 720. In the illustrated example of FIG. 8, the spark electrode 725 is electrically isolated from the chassis 810. A flame sensing voltage is measured across the flame sensor 735 and the chassis 810.

In the illustrated example of FIG. 8, a first terminal (e.g., a positive terminal) of the power supply 705 is connected to a first terminal (e.g., a positive terminal) of the ignitor 720 and a first terminal (e.g., a positive terminal) of the flame sense circuitry 730. A second terminal (e.g., a negative terminal) of the power supply 705 is connected to a second terminal (e.g., a negative terminal) of the ignitor 720, a second terminal (e.g., a negative terminal) of the flame sense circuitry 730, and the chassis 810. A third terminal of the ignitor 720 represents a positive high voltage terminal, which is connected to a first terminal of the spark electrode 725. A fourth terminal of the ignitor 720 represents a negative high voltage terminal, which is connected to a second terminal of the spark electrode 725. A third terminal of the flame sense circuitry 730 is connected to the flame sensor 735. In this manner, the sensing performed by the flame sensor 735 is referenced between the flame sensor 735 and the chassis 810, while the ignition is referenced between two terminals of the spark electrode.

Figure 9:
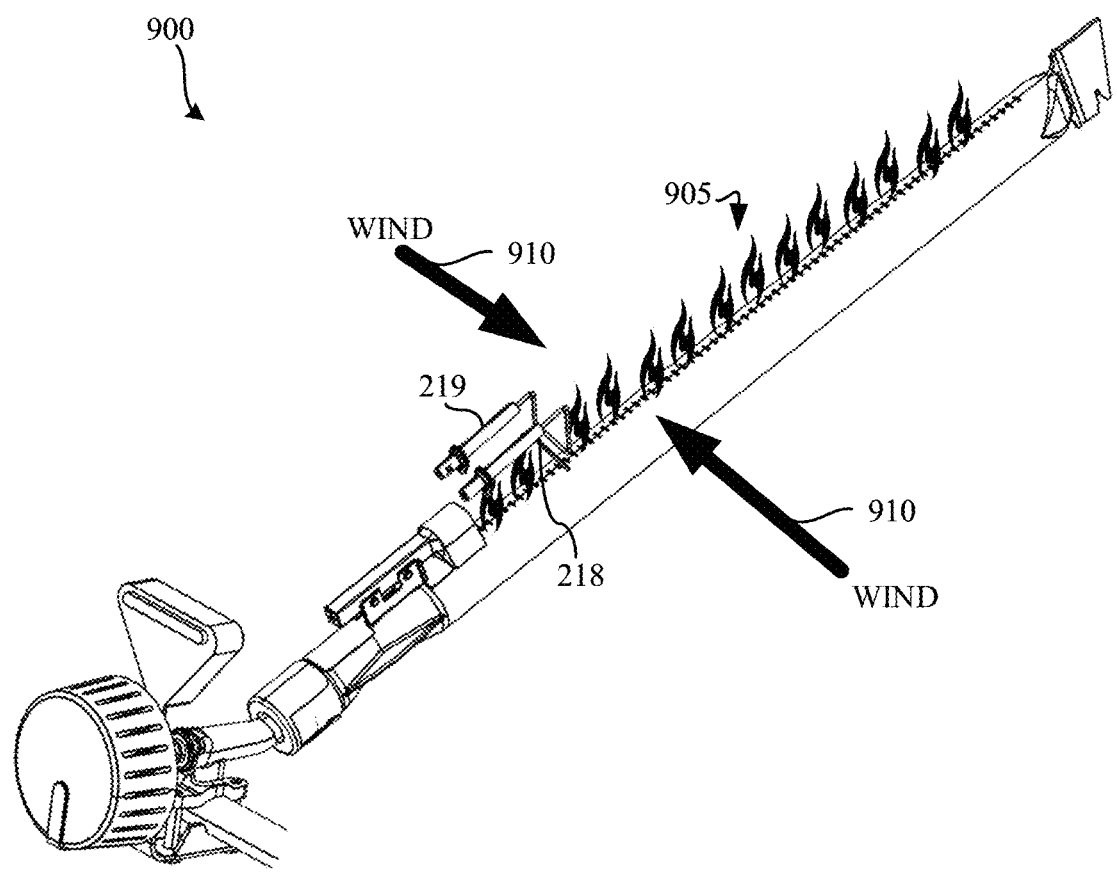
FIG. 9 is a diagram illustrating placement of multiple flame sensors with respect to an expected location of a flame.

FIG. 9 is a diagram illustrating placement of multiple flame sensors with respect to an expected location of a flame 905. Because gas grills, such as the gas grill 100 of FIG. 1, are typically used in outdoor environments, additional challenges are present as compared to traditional flame sensing use cases, such as, Heating, Ventilation, and Cooling (HVAC) systems. For example, wind 910 tends to cause the flame 905 to move with respect to the burner tube from which it is emitted. While in the illustrated example of FIG. 9, the wind 910 is shown as approaching the flame 905 from two directions, the wind 910 may approach the flame from any direction. As an example, when the wind 910 blows towards a leftward direction, the flame 905 tends to follow in the leftward direction. Such movement can cause the flame 905 to move to a location where it might not be able to be detected by one or more of the flame sensors.

Using two flame sensors 218, 219 as shown in the illustrated example of FIG. 9, enables the presence of the flame 905 to be more accurately detected across a larger area and/or volume. Detecting the flame across a larger area and/or volume ensures that the presence of the flame is accurately detected, even in windy environments.

In some examples, (e.g., where multiple flame sensors are utilized) additional logic is utilized in the example flame signal accessor 750 and/or, more generally, the flame sense circuitry 730, to, for example, detect whether at least one of the connected flame sensors 218, 219 indicates the presence of the flame. For example, the flame sense circuitry 730 may include one or more logic devices (e.g., OR gates) to enable detection of the presence of the flame when at least one of the flame sensors 218, 219 outputs a value representative of the presence of the flame. However, any other approach to processing input data from multiple flame sensors may additionally or alternatively be used such as, for example the values accessed by the flame signal accessor 750 may be averaged, the maximum value of the accessed values may be selected, etc.

Figure 10:
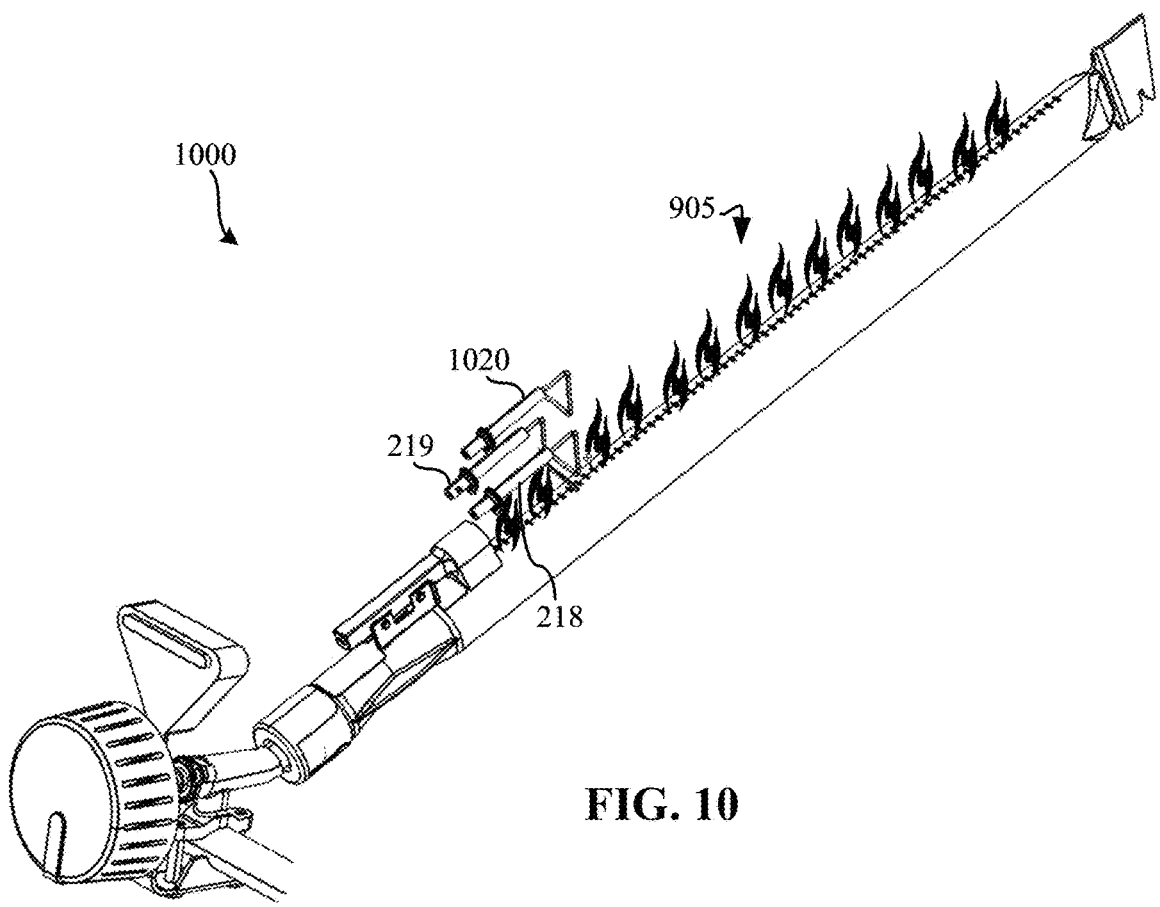
FIG. 10 is a diagram illustrating an alternative placement of multiple flame sensors with respect to the expected location of the flame of FIG. 9.

FIG. 10 is a diagram illustrating an alternative placement of multiple flame sensors with respect to the expected location of the flame 905. In the illustrated example of FIG. 10, three flame sensors 218, 219, 1020 are shown. The third flame sensor 1020 of the illustrated example of FIG. 10 is positioned at a location above the first and/or second flame sensors 218, 219. That is, the third flame sensor 1020 is positioned farther away from the burner tube than the first and/or second flame sensors 218, 219. Using such an arrangement enables a size of the flame to be detected. For example, it may be determined that a larger flame is being emitted from the burner tube when the third flame sensor 1020 indicates the presence of the flame, as opposed to when the third flame sensor 1020 does not indicate the presence of the flame. Such information may be useful in the context of detecting a larger flame at a "high heat" burner (e.g., a burner intended for searing food).

While in the illustrated example of FIG. 10, three discrete flame sensors 218, 219, 1020 are shown, in some examples, a single flame sensor module may be utilized that includes a plurality of flame sensing elements (e.g., flame rods, electrodes, etc.). Such an approach enables electrical connections to each of the flame sensors 218, 219, 1020 to be made via a single terminal (e.g., a multi-pin terminal), and enables a multi-conductor wire to be used to connect the flame sensors 218, 219, 1020 to the flame sense circuitry 730. This has the added benefit of simplifying manufacturing and/or assembly of the grill 100, which may, in some examples, be performed by an end-user. Further, the use of a flame sensor module with a plurality of flame sensing elements ensures the relative position of the flame sensing elements (e.g., flame rods, electrodes, etc.) with respect to each other. Using flame sensing modules with pre-determined relative positions to each other enables an accurate determination of the size of a flame.

Figure 11A:
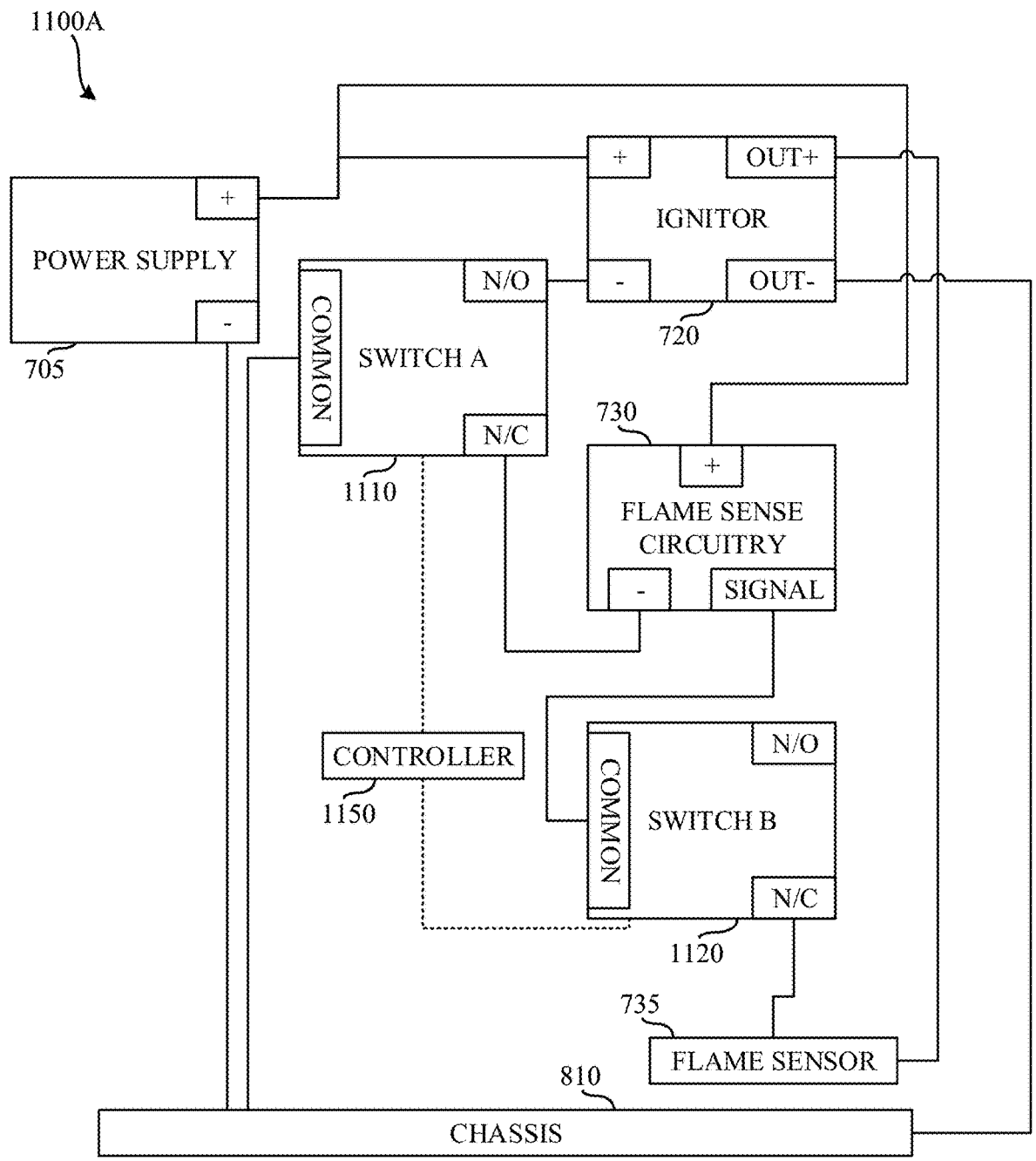
FIG. 11A is a block diagram of an example configuration of the flame ignition and sensing system of FIG. 7 using a single flame rod and switching of an electrical ground.

FIG. 11A is a block diagram of an example configuration 1100A of the flame ignition and sensing system of FIG. 7 using a single flame rod and switching of an electrical ground. In the illustrated example of FIG. 11A, the flame sensor 735 is additionally used as a spark electrode. In examples disclosed herein, a first switch 1110 switches an electrical connection to the chassis 810 between the ignitor 320 and the flame sense circuitry 330. A second switch 1120 switches an electrical connection between the flame sense circuitry 330 and the flame sensor 335. In the illustrated example of FIG. 11A, the first switch 1110 and the second switch 1120 are controlled by a controller 1150.

In the illustrated example of FIG. 11, a first terminal (e.g., a positive terminal) of the power supply 705 is connected to a first terminal (e.g., a positive terminal) of the ignitor 720 and a first terminal (e.g., a positive terminal) of the flame sense circuitry 730. A second terminal (e.g., a negative terminal) of the power supply 705 is connected to the chassis 810. The chassis 810 is connected to a common terminal of the first switch 1110.

A third terminal of the ignitor 720 represents a positive high voltage output terminal, which is connected to the flame sensor 735. A fourth terminal of the ignitor 720 represents a negative high voltage terminal, which is connected to the chassis 810. A third terminal (e.g., a signal terminal) of the flame sense circuitry 730 is connected to the flame sensor 735.

A normally open terminal of the first switch 1110 is connected to a second terminal (e.g., a negative terminal) of the ignitor 720. A normally closed terminal of the first switch 1110 is connected to a negative terminal of the flame sense circuitry 730.

The second switch 1120 includes a common terminal that is connected to a signal terminal of the flame sense circuitry 730. The second switch 1120 includes a normally closed terminal that is connected to the flame sensor 735. In this manner, the second switch 1120 enables the signal terminal of the flame sense circuitry to be isolated from the flame sensor 735 while the flame sensor is being used for ignition.

In examples disclosed herein, the first switch 1110 and the second switch 1120 are each implemented using electromechanical relays. However, any other past, present, and/or future approach to switching an electrical connection may additionally or alternatively be used including, for example, a solid state relay, a transistor, a physical switch, a valve switch, a knob switch, etc. In some examples, the first switch 1110 and the second switch 1120 are implemented using different technologies.

The example controller 1150 of the illustrated example of FIG. 11A controls the first switch 1110 and the second switch 1120 to cause the electrical isolation of the flame sense circuitry 730 during ignition. In this manner, the high voltages output by the ignitor 720 are less likely to cause electrical damage to the flame sense circuitry 730. In examples disclosed herein, the controller 1150 switches the first switch 1110 and the second switch 1120 at substantially the same time. However, in some examples, additional delays can be used. Moreover, in some examples, additional switches may additionally or alternatively be used to, for example, enable a delay to be created between a first time when the ignitor 720 is disabled and a second time when the flame sense circuitry 730 is enabled. In examples disclosed herein, the example controller 1150 operates in response to an ignition signal being received via, for example, the ignitor button 107. In examples disclosed herein, the controller 1150 is implemented by a logic circuit. However, the example controller 1150 may be implemented in any manner suitable for controlling switches such as, for example, a microprocessor. In some examples, the controller 1150 is implemented by a central controller such as the central controller 1410 described below in connection with FIG. 15. In such an example, the central controller 1410 may control multiple flame sense and/or ignition circuits associated with various burners of the gas grill 100. In examples disclosed herein, the example controller 1150 implements means for controlling.

Figure 11B:
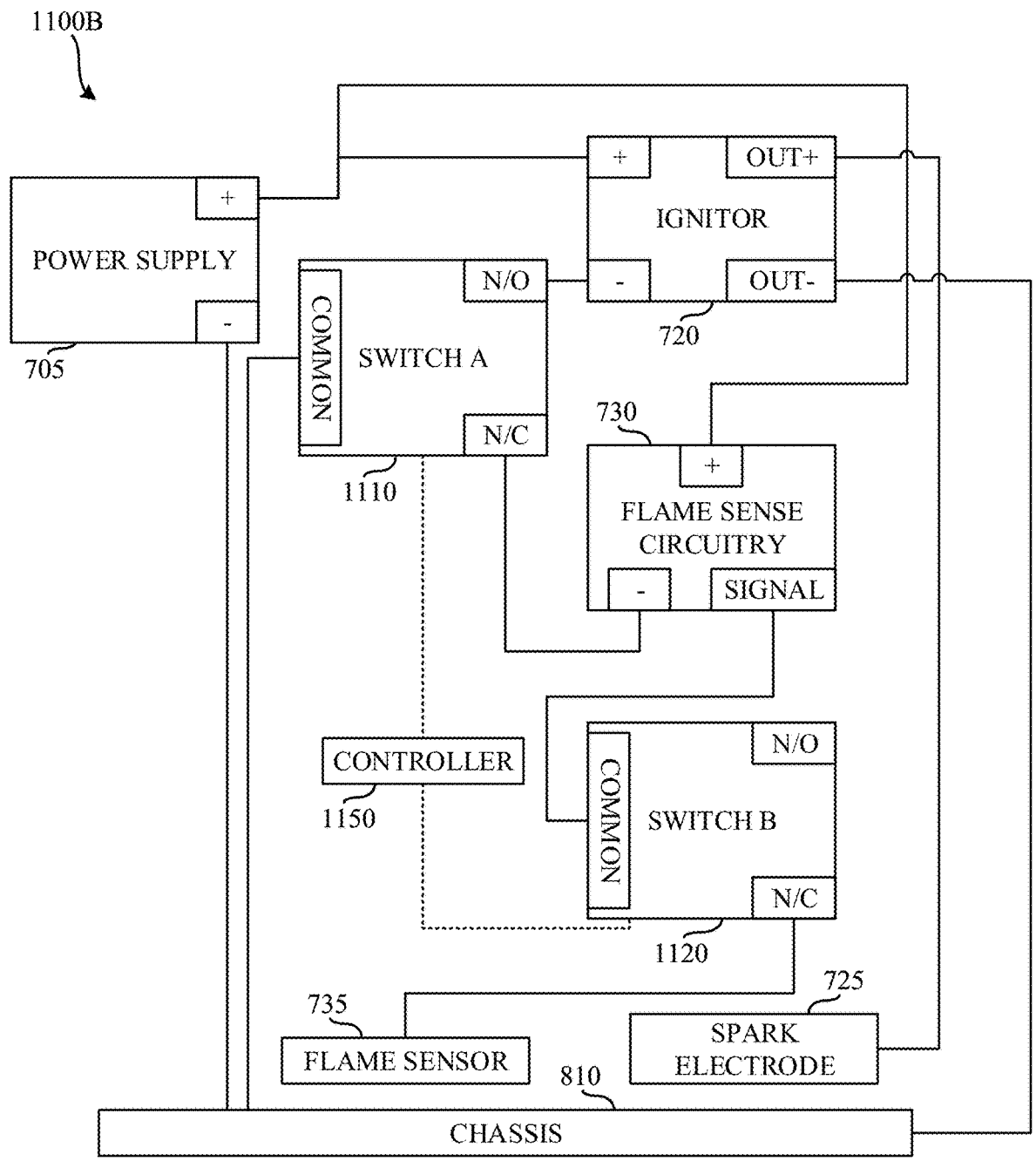
FIG. 11B is a block diagram of an example alternate configuration of the flame ignition and sensing system of FIG. 7 using a single flame rod and switching of an electrical ground.

FIG. 11B is a block diagram of an example alternate configuration 1100B of the flame ignition and sensing system of FIG. 7 using a single flame rod and switching of an electrical ground. In the illustrated example of FIG. 11B, the flame sensor 735 is separate from the spark electrode 725. Despite the separation, it is advantageous to continue to electrically isolate the flame sense circuitry 730 from the ignitor 720 while the ignitor is used to cause the spark electrode 725 to ignite fuel emitted from a burner.

Figure 12:
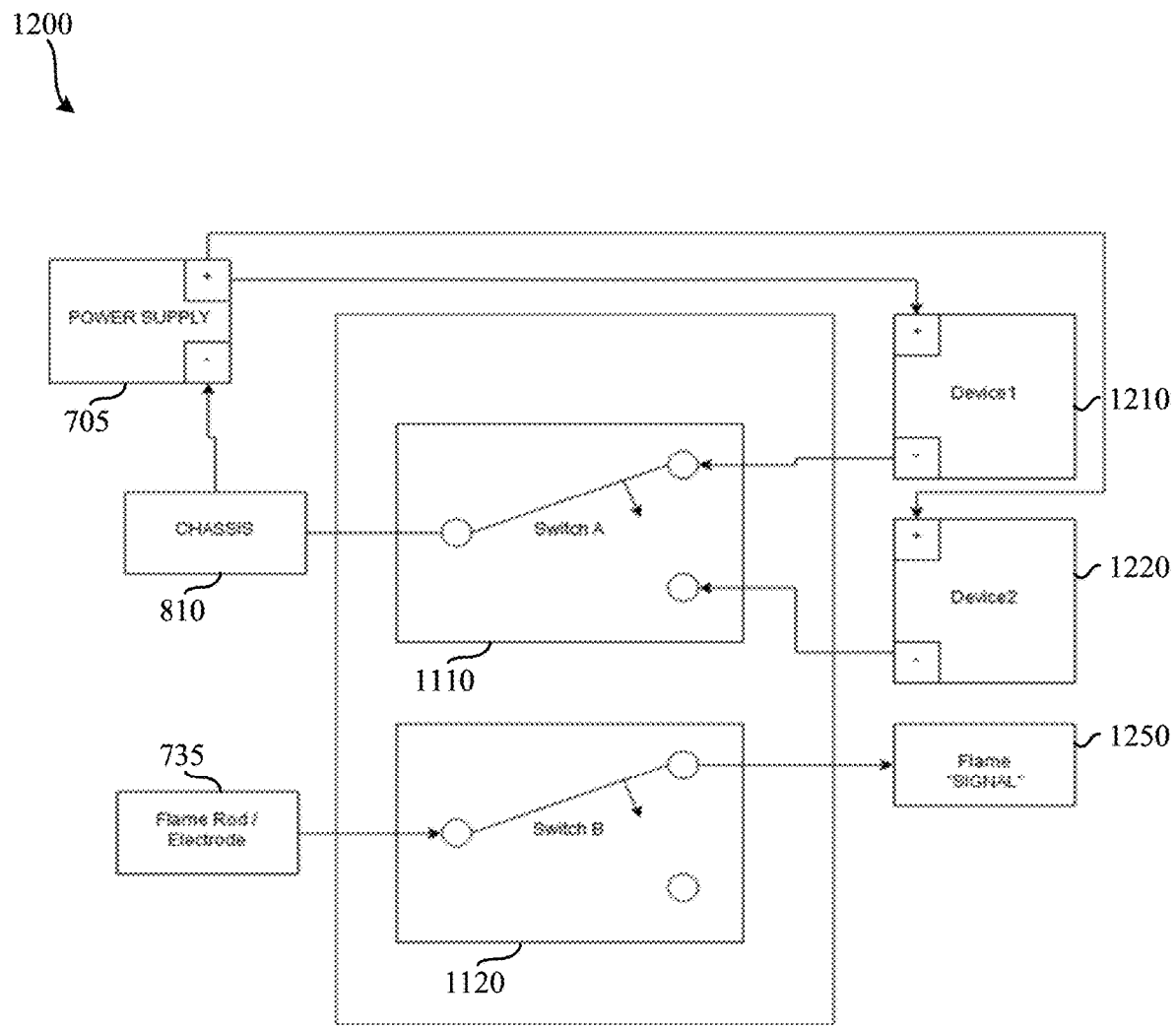
FIG. 12 is a block diagram illustrating an example implementation of the switches of FIG. 11.

FIG. 12 is a block diagram illustrating an example implementation of the switches of FIG. 11A. The example diagram 1200 includes the power supply 705, the chassis 810, the first switch 1110, the second switch 1120, the flame sensor 735, a first device 1230, a second device 1240, and a flame signal terminal 1250. In some examples, the first device 1210 represents the flame sensor 730, and the second device 1220 represents the ignitor 720. However, any other devices may additionally or alternatively be used.

In the illustrated example of FIG. 12, the first switch 1110 is shown in a first position, where the first device 1210 is electrically connected to the chassis 810 (thereby enabling the first device 1230). During such a configuration, the second device 1220 is not electrically connected to the chassis 810 and therefore is not enabled. When the second device 1220 is in a second position, the second device 1220 (e.g., the ignitor 720) is electrically connected to the chassis 810 (thereby enabling the second device 1220). During such a configuration, the first device 1210 is not electrically connected to the chassis 810, and is, therefore, not enabled. Using such a switching arrangement is beneficial because it ensures that the ignitor 720 (e.g., the second device 1220) is not enabled while flame sensing is being performed by the flame sense circuitry 730 (e.g., the first device 1210), as output of a high voltage by the ignitor 720 could potentially damage the flame sense circuitry 730.

In the illustrated example of FIG. 12, the second switch 1120 is shown in a first position, where the flame sensor 735 is electrically connected to the flame sense terminal 1250. While the second switch 1120 is in the first position, the flame sensor 735 can be used for detecting the presence of a flame. Conversely, when the second switch 1120 is in a second position, the flame sensor 735 is not connected to the flame sense terminal 1250, thereby disabling the ability to detect the presence of the flame (e.g., while the ignitor 720 is enabled and creating electrical noise and/or high output voltages). This has the added benefit of ensuring that the high voltage output by the ignitor 720 (e.g., the second device 1220) does not inadvertently damage the flame sense terminal 1250 and/or more generally, the first device 1210.

Figure 13:
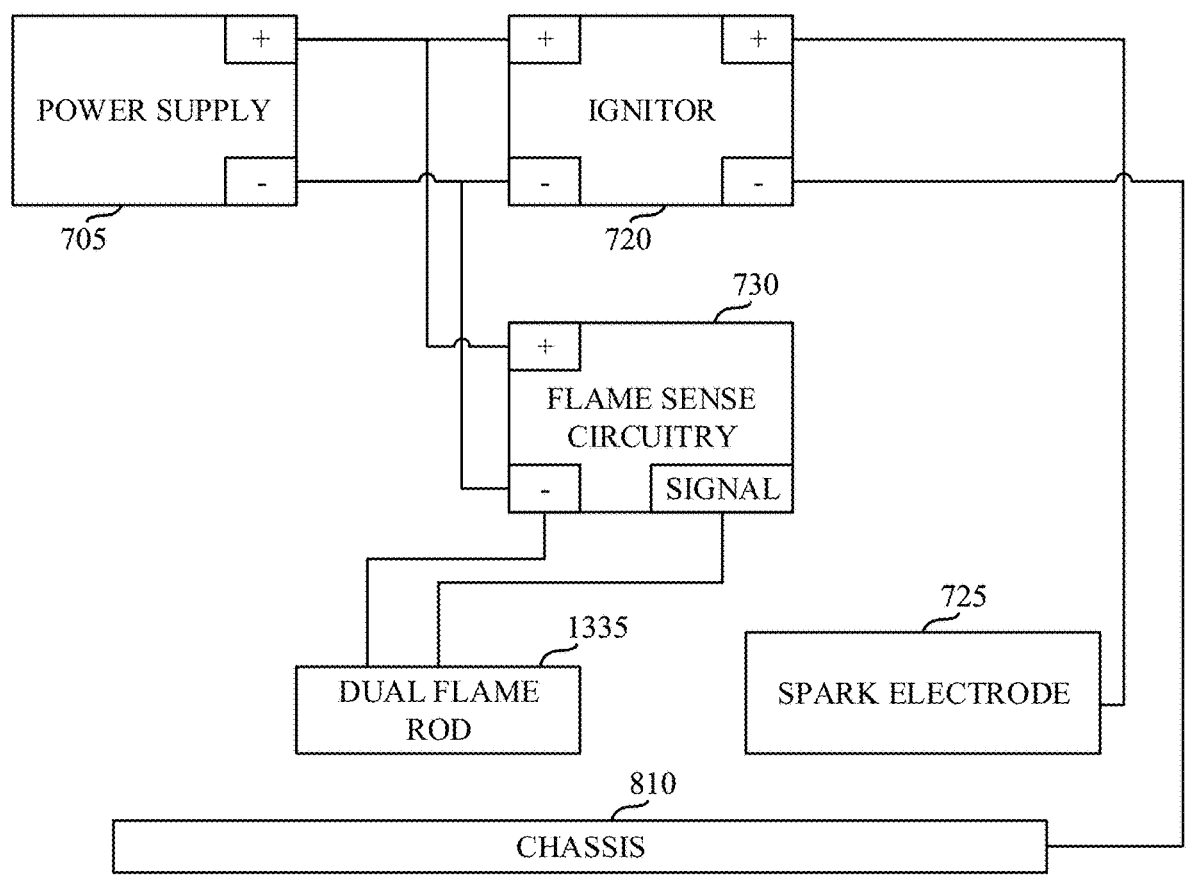
FIG. 13 is a block diagram of an example configuration of the flame ignition and sensing system of FIG. 7 using an isolated flame rod configuration.

FIG. 13 is a block diagram of an example configuration of the flame ignition and sensing system of FIG. 7 using an isolated flame rod configuration. In the illustrated example of FIG. 13, the isolated (e.g., dual) flame rod uses two flame rods that are electrically isolated from the chassis 810 and/or spark electrode 725. In this manner, electrical noise caused by the spark electrode 725 is avoided.

In the illustrated example of FIG. 13, a first terminal (e.g., a positive terminal) of the power supply 705 is connected to a first terminal (e.g., a positive terminal) of the ignitor 720 and a first terminal (e.g., a positive terminal) of the flame sense circuitry 730. A second terminal (e.g., a negative terminal) of the power supply 705 is connected to a second terminal (e.g., a negative terminal) of the ignitor 720, a second terminal (e.g., a negative terminal) of the flame sense circuitry 730, and a first terminal of the dual flame sensor 735. A third terminal of the ignitor 720 represents a positive high voltage terminal, which is connected to the spark electrode 725. A fourth terminal of the ignitor 720 represents a negative high voltage terminal, which is connected to the chassis 810. A third terminal of the flame sense circuitry 730 is connected to a second terminal of the flame sensor 735. In this manner, the sensing performed by the flame sensor 735 is referenced between the signal terminal of the flame sense circuitry and the negative terminal of the flame sense circuitry 730. That is, the flame sensor 735 is electrically isolated from the chassis 810.

Figure 14:
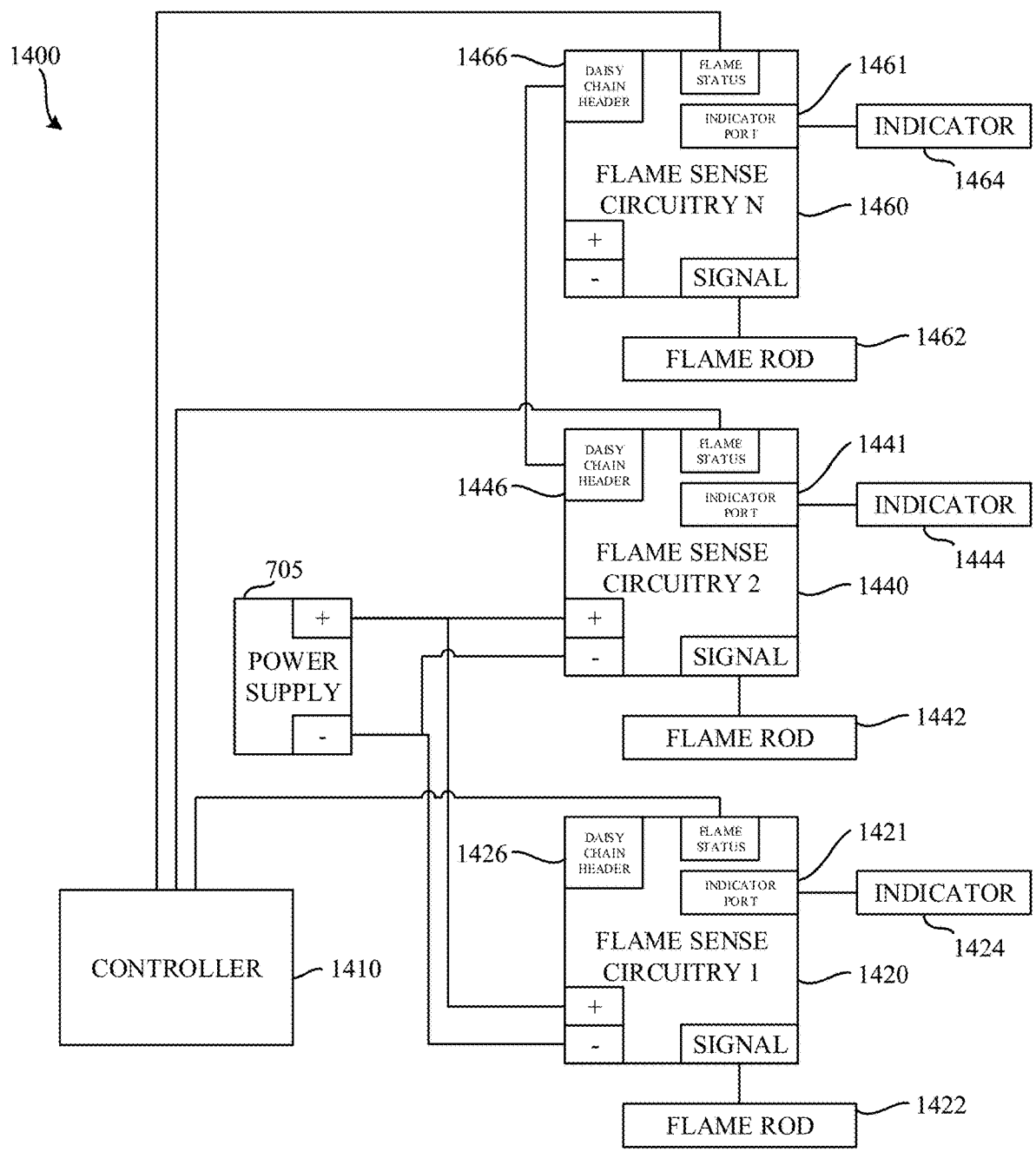
FIG. 14 is a block diagram of an example system including three flame sense circuits and a central controller.

FIG. 14 is a block diagram of an example system 1400 including three flame sense circuits 1420, 1440, 1460 and a central controller 1410. The example system 1400 of FIG. 14 includes the power supply 705. A first terminal of the power supply 305 (e.g., a positive terminal) is connected to a positive power terminal of the first flame sense circuitry 1420 and a positive terminal of the second flame sense circuitry 1440. A second terminal of the power supply 305 (e.g., a negative terminal) is connected to a negative power terminal of the first flame sense circuitry 1420 and a negative power terminal of the second flame sense circuitry 1440.

In the illustrated example of FIG. 14, the flame sense circuitry 1420, 1440, 1460 includes corresponding daisy chain headers 1426, 1446, 1466. In examples disclosed herein, the daisy chain headers enable power from the power supply to be shared between the different flame sense circuitries. In this manner, it is possible to simplify the harnessing by connecting all of the flame sense modules power rails in parallel (daisy-chain). This allows for mounting the flame sense modules to the front control panel before assembly.

In the illustrated example of FIG. 14, the first flame sense circuitry 1420 includes a signal terminal that is connected to a first flame rod 1422, the second flame sense circuitry 1440 includes a signal terminal that is connected to a second flame rod 1442, and the third flame sense circuitry 1460 includes a signal terminal that is connected to a third flame rod 1462. Each of the flame rods 1422, 1442, 1462 are positioned relative to corresponding burners.

In the illustrated example of FIG. 14, the first flame sense circuitry 1420 includes a first indicator port 1421 that is connected to a first indicator 1424, the second flame sense circuitry 1440 includes a second indicator port 1441 that is connected to a second indicator 1444, and the third flame sense circuitry 1460 includes a third indicator port 1461 that is connected to a third indicator 1464. In examples disclosed herein, the indicator ports 1421, 1441, 1461 are implemented using light emitting diodes LEDs, and the indicators 1424, 1444, 1464 are implemented using light pipes that guide light emitted from the indicator port to a location on the grill that is visible by the user. However, in some examples, the indicator ports 1421, 1441, 1461 may be implemented using electrical connections and the indicators 1424, 1444, 1464 may be implemented by light emitting diodes and/or any other past, present, and/or future indicators that may indicate a status output by the corresponding flame sense circuitry 1420, 1440, 1460. That is, in some examples, the indicators 1424, 1444, 1464 might not be implemented using light pipes. In some examples, the indicators 1424, 1444, 1464 may be implemented as arrays of LEDs. Such an array of LEDs may be implemented in any manner including, for example as a ring of LEDs. In such an example, the arrays of LEDs may include multiple LEDs that are individually addressable, allowing for output of multiple types of information. For example, if a flame is not sensed, but a valve is open, the LEDs of the corresponding array of LEDs can be set to a first color (e.g., red), while, if a flame is sensed, the LEDs of the corresponding array of LEDs can be individually controlled to, for example, indicate a state of the knob using a second color (e.g., green). Moreover, in some examples, the indicator port and/or indicator may provide an indication of a signal strength (e.g., a variable amount of detected flame).

In the illustrated example of FIG. 14, the flame sense circuitries 1420, 1440, 1460 each include a respective flame status terminal. The flame status terminal(s) are implemented using an open drain connection. The optional open drain connection allows an external controller (e.g., the controller 1410) to understand the status of the flame sense modules flame detection. That is, an additional controller can be used to process the flame sense module status. Each of the flame status terminals are connected to inputs on the controller 1410. Each of the flame status terminals indicate, to the controller 1410, whether a flame has been detected by the corresponding flame sense circuitry 1420, 1440, 1460. This enables the controller 1410 to, for example, present an indication (e.g., separate from the indicators 1424, 1444, 1464) indicating whether a flame has been sensed. In some examples the controller 1410 may communicate with remote entities to indicate whether the flame is sensed. Such communication enables, for example, messages to be transmitted to a user when a flame that was lit becomes extinguished (e.g., blown out by the wind). Such messages may be implemented as Short Message Service (SMS) messages, push notifications (e.g., to a mobile device), etc. In some examples, the controller 1410 may interact with valves of the grill to attempt to reignite a flame after it becomes extinguished and was intended to be lit.

Figure 15:
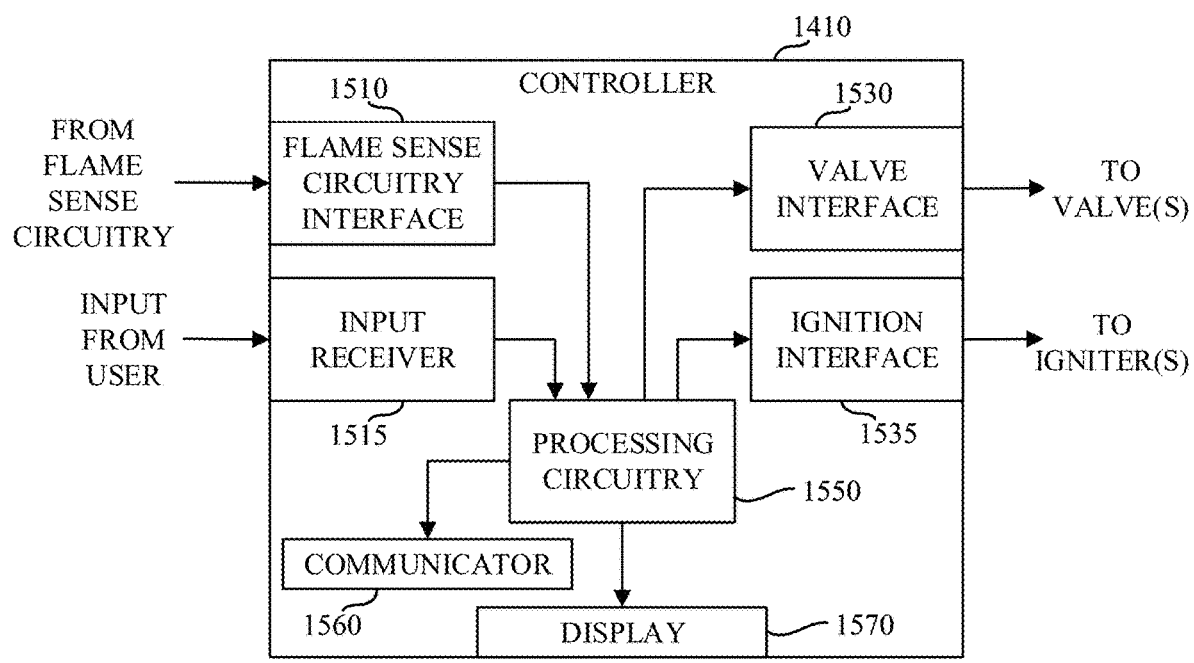
FIG. 15 is a block diagram of an example implementation of the controller of FIG. 14.

FIG. 15 is a block diagram of an example implementation of the controller 1410 of FIG. 14. The example controller 1410 of the illustrated example of FIG. 15 includes a flame sense circuitry interface 1510, an input receiver 1515, a valve interface 1530, an ignition interface 1535, processing circuitry 1550, a communicator 1560, and a display 1570.

The example flame sense circuitry interface 1510 of the illustrated example of FIG. 15 is implemented using one or more input port(s) that are connected to each corresponding flame sense circuitry. The example flame sense circuitry interface 1510 gathers flame sense information from the corresponding flame sense circuitry 730. In some examples, the flame sense information is provided as a binary logic level. However, any other past, present, and/or future approach to communicating with another circuit (e.g., the flame sense circuitry) may additionally or alternatively be used such as, for example, a serial bus, an inter-integrated circuit (I²C) bus, etc.

The example input receiver 1515 of the illustrated example of FIG. 15 receives a user input identifying a desired state of a burner (e.g., ignited, not ignited, or any value in between). In some examples, additional information may be received such as a current and/or desired temperature(s) of the cooking area, a desired position of a valve, etc.

The example valve interface 1530 of the illustrated example of FIG. 15 enables electronic control of a valve (e.g., valves 214, 224, 234) by the controller. In this manner, the controller 1410 can control a valve to move to an open position, a closed position, or a position intermediate the open position and the closed position.

The example ignition interface 1535 of the illustrated example of FIG. 15 enables the controller 1410 to control whether one or more of the ignitors are enabled.

The example processing circuitry 1550 of the illustrated example of FIG. 15 compares a current state of the flames to a desired state of the flames to determine whether any action is to be taken. Such actions may include, for example, enabling an igniter to attempt ignition (and/or re-ignition), opening a valve, closing a valve, transmitting a notification, displaying an indication, etc.

The example communicator 1560 of the illustrated example of FIG. 15 is implemented using a wireless communicator such as, for example a Bluetooth interface, a WiFi interface, a radio frequency (RF) interface (e.g., a radio frequency interface operating at 1400 megahertz (MHZ)), etc. The example communicator 1560 enables the controller 1410 to communicate with external devices and/or entities (e.g., cloud servers, mobile devices, etc.) to provide status updates and/or alerts (e.g., a status of the flame). In some examples, the communicator 1560 enables the controller 1410 to communicate analog values and/or serial data to other controllers (e.g., a secondary controller, flame sense circuitry, valve control circuitry, etc.) internal to and/or external to the gas grill.

The example display 1570 of the illustrated example of FIG. 15 is implemented using a display device such as, for example, a light emitting diode (LED), an organic light emitting diode (OLED), a liquid crystal display, a cathode ray tube display (CRT), a touchscreen, a tactile output device, a printer, speakers, etc. to provide an output to the user indicating, for example, the presence of the flame.

While an example manner of implementing the flame sense circuitry 730 is illustrated in FIG. 7, one or more of the elements, processes and/or devices illustrated in FIG. 7 may be combined, divided, re-arranged, omitted, eliminated and/or implemented in any other way. Further, the example flame signal accessor 750, the example filter 755, the example comparator 760, the example indicator 765, the example communicator 770, and/or, more generally, the example flame sense circuitry 730 of FIG. 7 may be implemented by hardware, software, firmware and/or any combination of hardware, software and/or firmware. Thus, for example, any of the example flame signal accessor 750, the example filter 755, the example comparator 760, the example indicator 765, the example communicator 770, and/or, more generally, the example flame sense circuitry 730 of FIG. 7 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example flame signal accessor 750, the example filter 755, the example comparator 760, the example indicator 765, the example communicator 770, and/or, more generally, the example flame sense circuitry 730 of FIG. 7 is/are hereby expressly defined to include a non-transitory computer readable storage device or storage disk such as a memory, a digital versatile disk (DVD), a compact disk (CD), a Blu-ray disk, etc. including the software and/or firmware. Further still, the example flame sense circuitry 730 of FIG. 7 may include one or more elements, processes and/or devices in addition to, or instead of, those illustrated in FIG. 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Further, while an example manner of implementing the example controller 1410 of FIG. 15 is illustrated in FIG. 15, one or more of the elements, processes and/or devices illustrated in FIG. 15 may be combined, divided, re-arranged, omitted, eliminated and/or implemented in any other way. Further, the example flame sense circuitry interface 1510, the example input receiver 1515, the example valve interface 1530, the example ignition interface 1535, the example processing circuitry 1550, the example communicator 1560, the example display 1570, and/or, more generally, the example controller 1410 of FIG. 15 may be implemented by hardware, software, firmware and/or any combination of hardware, software and/or firmware. Thus, for example, any of the example flame sense circuitry interface 1510, the example input receiver 1515, the example valve interface 1530, the example ignition interface 1535, the example processing circuitry 1550, the example communicator 1560, the example display 1570, and/or, more generally, the example controller 1410 of FIG. 15 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example flame sense circuitry interface 1510, the example input receiver 1515, the example valve interface 1530, the example ignition interface 1535, the example processing circuitry 1550, the example communicator 1560, the example display 1570, and/or, more generally, the example controller 1410 of FIG. 15 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller 1410 of FIG. 15 may include one or more elements, processes and/or devices in addition to, or instead of, those illustrated in FIG. 15, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 16:
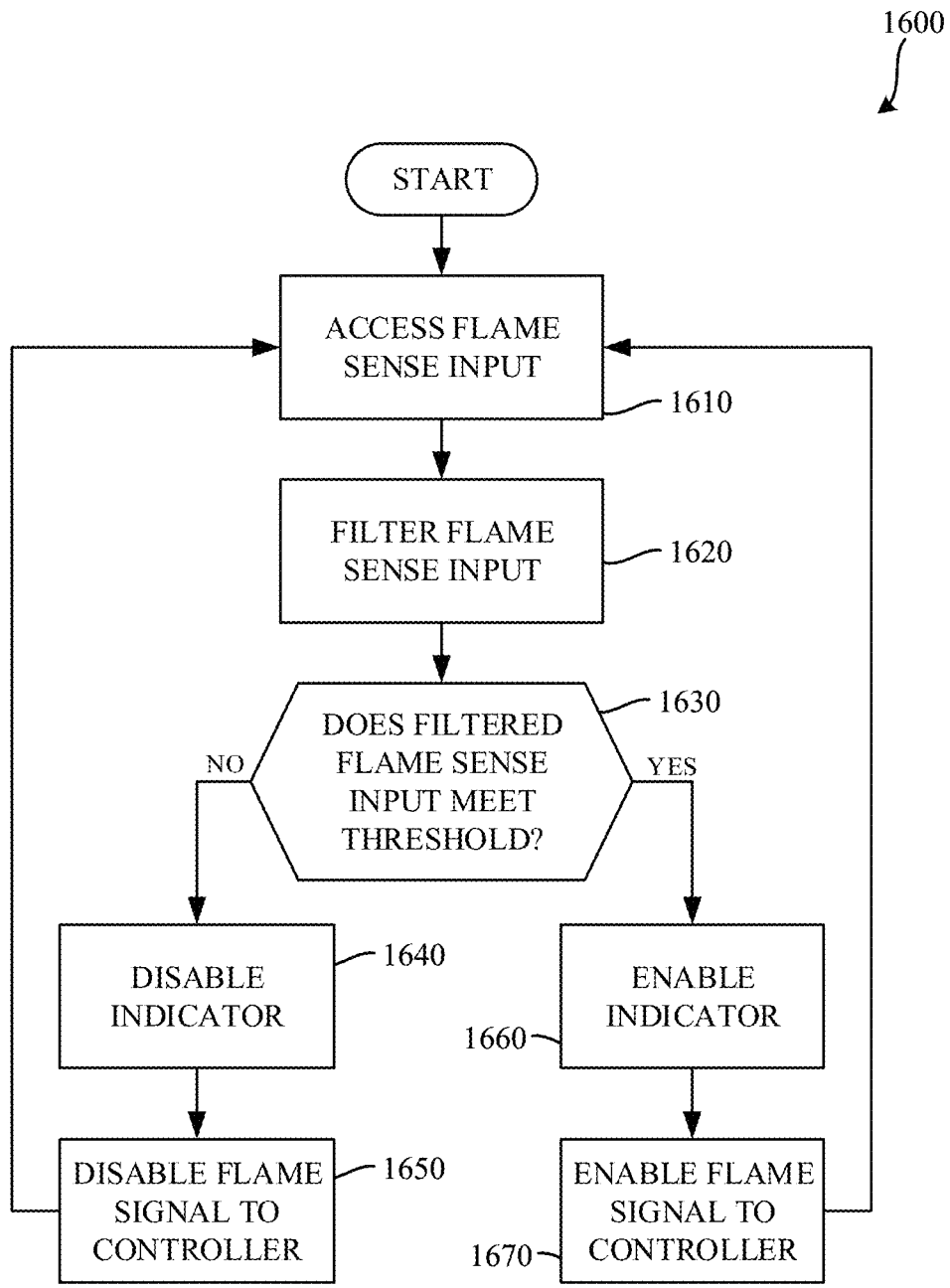
FIG. 16 is a flowchart representative of example machine-readable instructions that, when executed, cause at least one machine to indicate presence of a flame.
Figure 17:
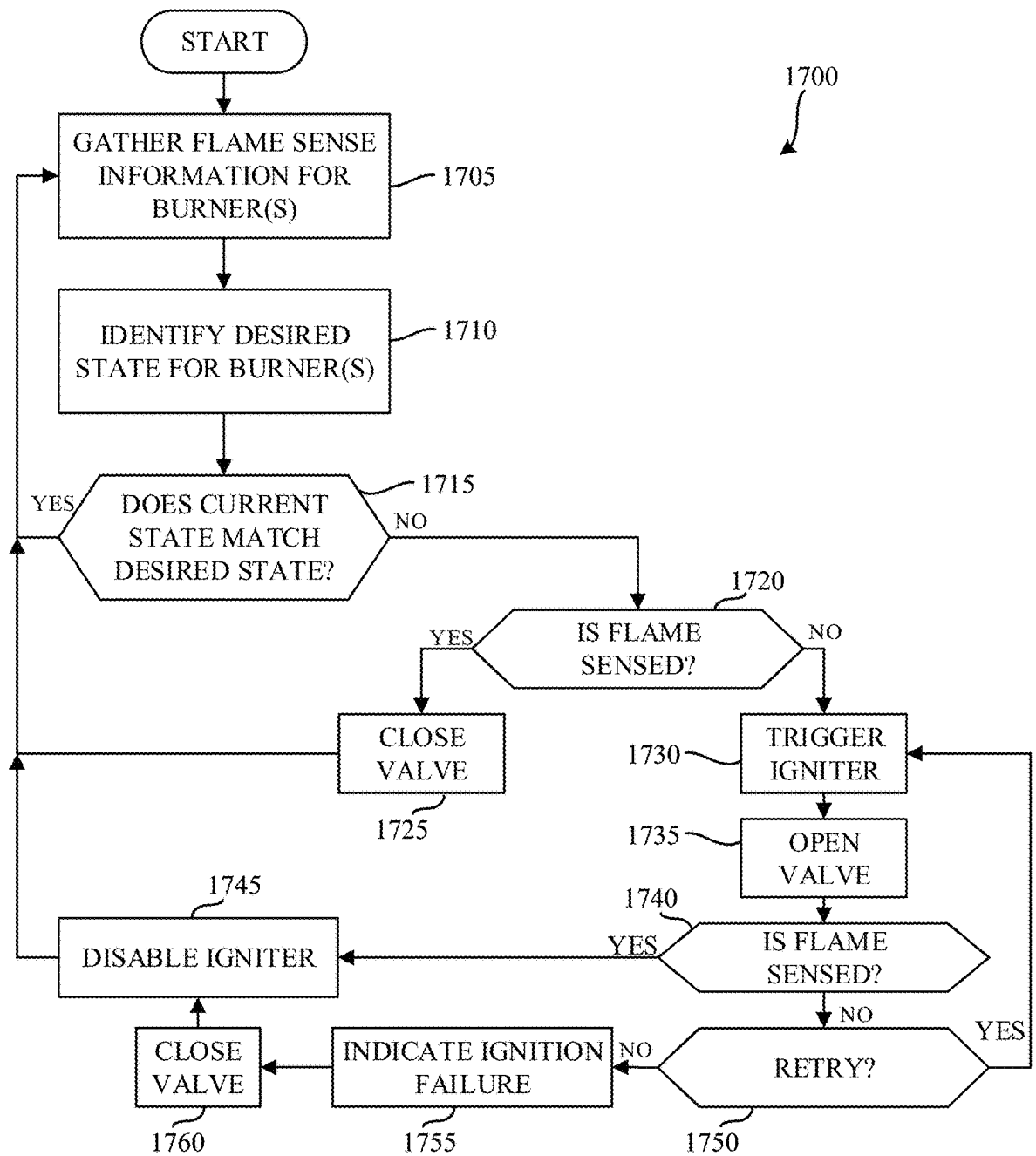
FIG. 17 is a flowchart representative of example machine-readable instructions that, when executed, cause the controller of FIG. 15 to monitor a status of a flame.

A flowchart representative of example hardware logic, machine readable instructions, hardware implemented state machines, and/or any combination thereof for implementing the flame sense circuitry 730 of FIG. 7 is shown in FIG. 16. A flowchart representative of example hardware logic, machine readable instructions, hardware implemented state machines, and/or any combination thereof for implementing the controller 1410 of FIG. 15 is shown in FIG. 17. The machine readable instructions may be one or more executable programs or portion(s) of an executable program for execution by a computer processor such as the processor 1812 shown in the example processor platform 1800 discussed below in connection with FIG. 18. The program may be embodied in software stored on a non-transitory computer readable storage medium such as a CD-ROM, a floppy disk, a hard drive, a DVD, a Blu-ray disk, or a memory associated with the processor 1812, but the entire program and/or parts thereof could alternatively be executed by a device other than the processor 1812 and/or embodied in firmware or dedicated hardware. Further, although the example program is described with reference to the flowchart illustrated in FIGS. 16 and/or 17, many other methods of implementing the example flame sense circuitry 730 and/or the example controller 1410 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 16 and/or 17 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 16 is a flowchart representative of example machine-readable instructions 1600 that, when executed, cause at least one machine to indicate presence of a flame. The example process 1600 of the illustrated example of FIG. 16 begins when the example flame signal accessor 750 accesses a flame sense input from the flame sensor 735. (Block 1610). In some examples, the accessing of the flame sense input involves applying a voltage across the flame sensor 735 and a ground connection (e.g., the chassis of the grill, a burner tube, another flame sensor, the spark electrode, etc.), and measuring an amount of current that is used (and/or, alternatively, a resistance across the flame sensor and the ground connection). In some examples, the accessing of the flame sense input from the flame sensor is performed periodically (e.g., every second, every one hundred milliseconds, etc.). Performing the flame sensing periodically reduces power usage, thereby extending battery life of the grill.

In some alternative examples, the accessing of the flame sense input involves measuring a voltage across the flame sensor and the ground connection. In such an example, the voltage measured represents ions from the flame. Such flame sensing is thus performed using much smaller values (e.g., millivolt level measurements) as compared to when voltage is applied across the flame sensor and the ground connection. Power requirements are thereby reduced, as voltage need not be applied across the flame sensor and the ground connection. However, measurement of such smaller values can, in some examples, be less stable than measurements taken by applying a voltage across the flame sensor and the ground connection.

The filter 755 filters the flame sense input to create a filtered flame sense input. (Block 1620). In examples disclosed herein, the filtering applied by the filter 755 removes noise from the flame sense input (e.g., high frequency noise). However, any other past, present, and/or future type of filtering may additionally or alternatively be applied to the flame sense input. For example, a band pass filter may be additionally or alternatively applied to, in addition to filtering high frequency noise, filter low frequency noise associated with momentary losses in a flame sense signal resulting from wind.

The comparator 760 compares a value of the filtered flame sense input to a flame sense threshold. (Block 1630). If the comparator 760 determines that the filtered flame sense input does not meet the threshold (e.g., block 1630 returns a result of NO), the example indicator 765 is disabled. (Block 1640). In some examples, because the indicator 765 is an external indicator, disabling the indicator 765 enables the user to view the status of a flame without having to open the lid of the grill. The example communicator 770 then disables a flame signal that is transmitted to the controller. (Block 1650). In some examples, the flame signal may be implemented using a binary logic level (e.g., a transistor-transistor logic (TTL) voltage level). However, any other past, present, and/or future approach to communicating a value to a controller may additionally or alternatively be used such as, for example, a serial bus, a Controller Area Network (CAN) bus, an inter-integrated circuit (I²C) bus, etc. Control then returns to block 1610, where the example flame sense circuitry 730 continues to monitor for the presence of a flame and provide an indication of the same.

If the comparator 760 determines that the filtered flame sense input meets the threshold (e.g., block 1630 returns a result of YES), the example indicator 765 is enabled. (Block 1660). Enabling the indicator 765 enables the user to view the status of the flame without having to open the lid of the grill. The example communicator 770 then enables a flame signal that is transmitted to the controller. (Block 1670). As noted above in connection with block 1650, the flame signal may be implemented using any past, present, and/or future approach to communicating a value to a controller.

In some examples, the example comparator 760 may additionally compare the flame sense input to other thresholds. For example, if there were no detected resistance between the flame sensor and the grounding location (e.g., the burner tube), this could indicate that there is a misconfiguration causing a short circuit between the flame sensor and the grounding location. Such a situation may occur if, for example, the flame sensor became bent and/or moved in a manner such that it was touching the burner tube. In such a situation, a third path of execution may be utilized that, for example, causes the indicator to blink (e.g., indicating an error) and/or causes an error message to be transmitted to the controller. This allows the controller to take precautionary measures to, for example, stop the flow of fuel (e.g., as the presence of a flame might not be accurately sensed), notify the user, etc.

Control then returns to block 1610, where the example flame sense circuitry 730 continues to monitor for the presence of a flame and provide an indication of the same.

FIG. 17 is a flowchart representative of example machine-readable instructions 1700 that, when executed, cause the controller 1410 of FIG. 15 to monitor a status of a flame. In examples disclosed herein, the status of the flame is reported to the controller 1410 by the flame sense circuitry 730. The example process 1700 of the illustrated example of FIG. 17 begins when the flame sense circuitry interface 1510 gathers flame sense information from the corresponding flame sense circuitry 730. (Block 1705). In some examples, the flame sense circuitry interface 1510 may gather flame sense information from multiple flame sense circuitries (e.g., as shown in FIG. 14). The example input receiver 1515 identifies a desired state for each of the burners corresponding to the flame sense information received from the flame sense circuitries. (Block 1710). The example processing circuitry 1550 determines whether the current state of the burner (e.g., ignited or not ignited) matches the desired state for that burner. (Block 1715). In some examples, additional information may be considered such as a current and/or desired temperature(s) of the cooking area. If the current state of the burner matches the desired state of the burner (e.g., block 1715 returns a result of YES), control returns to block 1705 where the example controller 1410 continues to monitor the current and desired flame states.

If the current state of the burner does not match the desired state of the burner (e.g., block 1715 returns a result of NO), the processing circuitry 1750 determines whether the flame is sensed. (Block 1720). If the flame has been sensed (e.g., block 1720 returns a result of YES), this means that a flame has been sensed when no flame is desired. The example valve interface 1530 interfaces with the valve (e.g., the valve 214, 224, 234), to close the valve. (Block 1725). As a result of the valve being closed, the flame should become extinguished (as no fuel is emitted from the burner tube). However, in some examples the controller may additionally return to monitoring for whether flame is properly extinguished and, in the event that the flame is not properly extinguished may provide an indication of the unwanted flame and/or transmit a notification via the communicator 1560 indicating a failure (e.g., a valve failure). In some examples, the valve may interact with a master control valve that may be attached to a fuel supply line to attempt to further extinguish the flame.

Returning to block 1720, if no flame is sensed (e.g., block 1720 returns a result of NO), this means that either the desired state of the burner has changed to request a flame, or a prior flame has become extinguished. The example ignition interface 1535 interfaces with an appropriate igniter 720 to trigger ignition of the flame. (Block 1730). The example valve interface 1530 interfaces with the corresponding valve (e.g., the valve 214, 224, 234), to open the valve. (Block 1735). As a result, with the igniter being triggered and the valve being open, fuel is expected to be supplied for ignition by the igniter. During ignition, the flame sense circuitry 730 may, in some examples, be disabled and/or isolated (e.g., as described above in connection with FIGS. 11A, 11B, and/or 12). Disabling and/or isolating the flame sense circuitry 730 reduces the likelihood that the flame sense circuitry 730 becomes damaged by the spark created by the spark electrode.

The example processing circuitry 1550 then determines whether the flame has been sensed. (Block 1740). If the flame is sensed (e.g., block 1740 returns a result of YES), the example ignition interface 1535 disables the igniter. (Block 1745). If the flame is not sensed (e.g., block 1740 returns a result of NO), the example processing circuitry 1550 determines whether to retry the ignition. (Block 1750). In some examples, re-ignition may be attempted up to a threshold number of times (e.g., five attempts). However, in some other examples, reignition may be attempted for a threshold amount of time (e.g., thirty seconds).

If the example processing circuitry 1550 determines that ignition should be retried (e.g., block 1750 returns a result of YES) control proceeds to block 1730 where ignition is reattempted. If the example processing circuitry 1550 determines that ignition should not be retried (e.g., block 1750 returns a result of NO), control proceeds to block 1755, where the communicator 1560 and/or the display 1570 provide an indication of the ignition failure. (Block 1755). The example valve interface 1530 then closes the valve. (Block 1760). The example ignition interface 1535 then disables the igniter. (Block 1745). Control then returns to block 1705 where the example controller 1410 continues to monitor the current and desired flame states.

Figure 18:
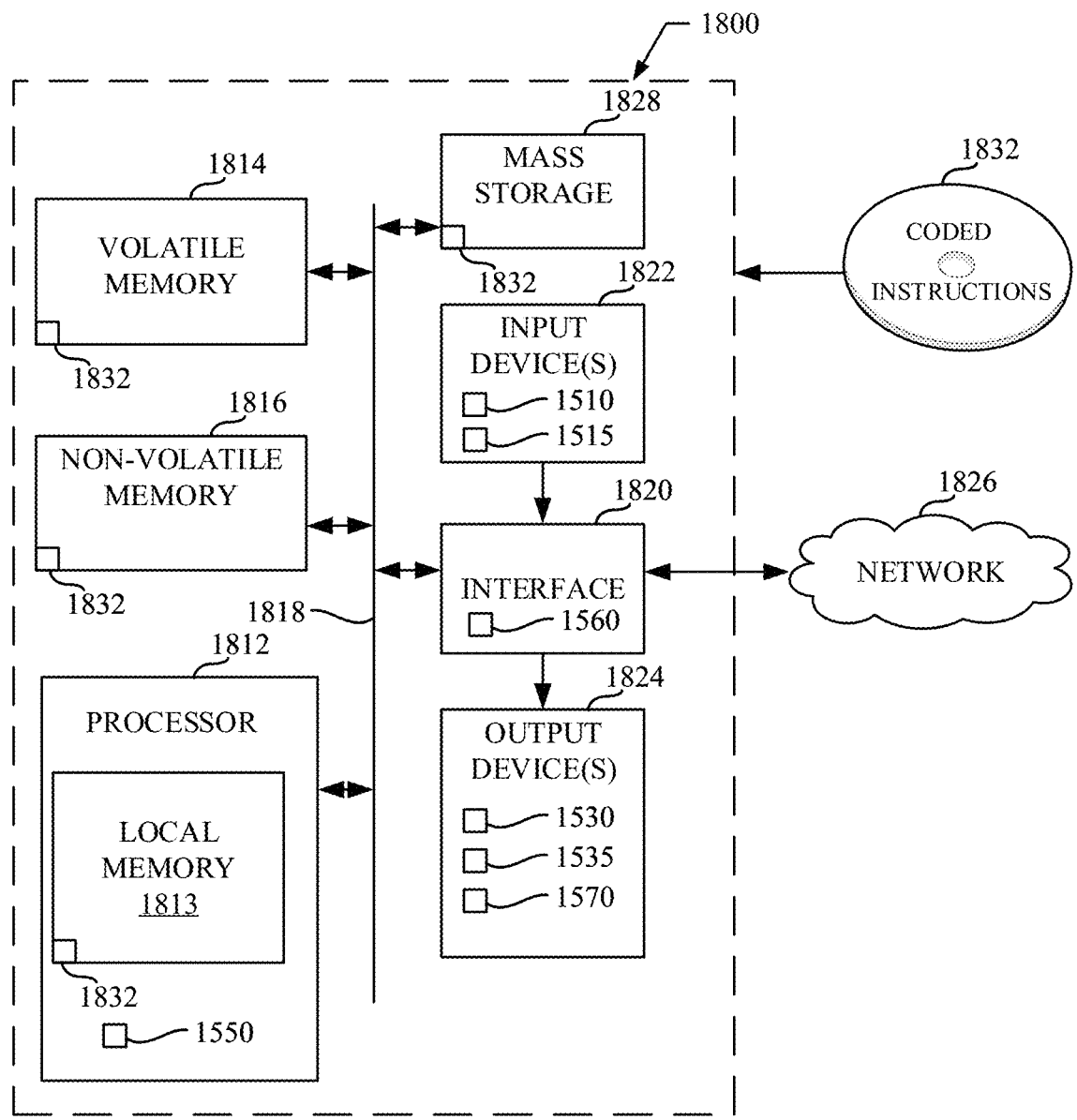
FIG. 18 is a block diagram of an example processor platform structured to execute the instructions of FIG. 17 to implement the example controller of FIG. 15.

FIG. 18 is a block diagram of an example processor platform 1800 structured to execute the instructions of FIG. 17 to implement the controller 1410 of FIG. 15. The processor platform 1800 can be, for example, a server, a personal computer, a workstation, a self-learning machine (e.g., a neural network), a mobile device (e.g., a cell phone, a smart phone, a tablet such as an iPad™), an embedded device, a system on a chip (SoC), or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example processing circuitry 1550.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), a Bluetooth® interface, a near field communication (NFC) interface, a Controller Area Network (CAN) bus, and/or a PCI express interface.

In the illustrated example, one or more input devices 1822 are connected to the interface circuit 1820. The input device(s) 1822 permit(s) a user to enter data and/or commands into the processor 1812. The input device(s) can be implemented by, for example, an audio sensor, a microphone, a camera (still or video), a keyboard, a button, a mouse, a touchscreen, a track-pad, a trackball, isopoint and/or a voice recognition system. The example input devices 1822 may implement the example flame sense circuitry interface 1510 and/or the example input receiver 1515.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1820 of the illustrated example, thus, typically includes a graphics driver card, a graphics driver chip and/or a graphics driver processor. The example output devices 1824 may implement the example valve interface 1530, the example ignition interface 1535, and/or the example display 1570.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a digital subscriber line (DSL) connection, a telephone line connection, a coaxial cable system, a satellite system, a line-of-site wireless system, a cellular telephone system, etc. The example interface circuit 1820 may implement the example communicator 1560.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, redundant array of independent disks (RAID) systems, and digital versatile disk (DVD) drives.

The machine executable instructions 1832 of FIG. 18 may be stored in the local memory 1832, in the mass storage device 1828, in the volatile memory 1814, in the non-volatile memory 1816, and/or on a removable non-transitory computer readable storage medium such as a CD or DVD.

Figure 19:
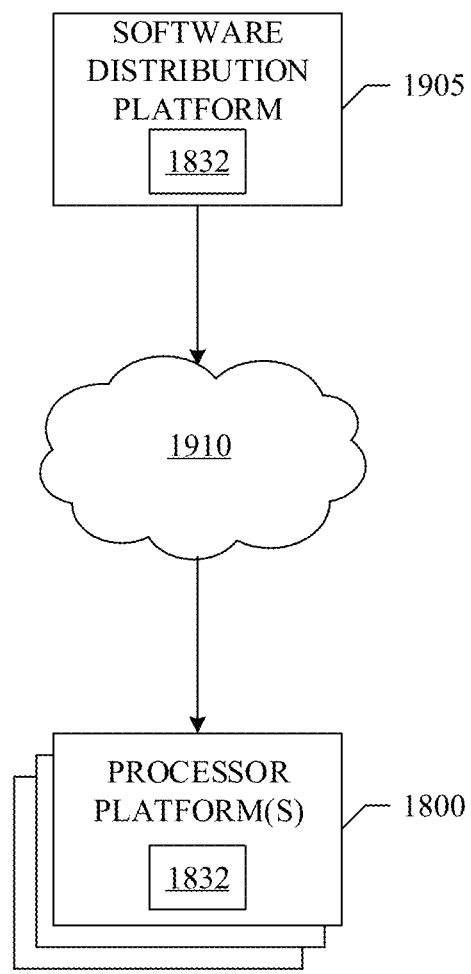
FIG. 19 is a block diagram of an example software distribution platform to distribute software (e.g., software corresponding to the example computer readable instructions of FIGS. 16 and/or 17) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1905 to distribute software such as the example computer readable instructions 1832 of FIG. 18 to third parties is illustrated in FIG. 19. The example software distribution platform 1905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1832 of FIG. 18. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the computer readable instructions 1832, which may correspond to the example computer readable instructions 1600 of FIG. 16 and/or the example computer readable instructions 1700 of FIG. 17, as described above. The one or more servers of the example software distribution platform 1905 are in communication with a network 1910, which may correspond to any one or more of the Internet and/or any of the example networks 1826 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1832 from the software distribution platform 1905. For example, the software, which may correspond to the example computer readable instructions 1832 of FIG. 18, may be downloaded to the example processor platform 1800, which is to execute the computer readable instructions 1832 to implement the central controller 1410. In some example, one or more servers of the software distribution platform 1905 periodically offer, transmit, and/or force updates to the software (e.g., the example computer readable instructions 1832 of FIG. 18) to ensure improvements, patches, updates, etc. are distributed and applied to the software at the end user devices. In some examples, the instructions downloaded to the central controller 1410 include instructions that are provided to the flame sense circuitry in the form of, for example, a firmware update. Such firmware update may enable, for example, more efficient analysis of a flame signal to detect the presence of a flame.

From the foregoing, it will be appreciated that example methods, apparatus and articles of manufacture have been disclosed that enable detection of the presence of a flame in a grill. The disclosed methods, apparatus and articles of manufacture improve the efficiency of using a grill because the user need not open the lid of the grill to determine whether a flame is present. The disclosed methods, apparatus and articles of manufacture are accordingly directed to one or more improvement(s) in the functioning of a grill.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to indicate presence of a flame are disclosed herein. Further examples and combinations thereof include the following:

Example 1 includes a gas grill comprising a burner tube having apertures to emit a fuel for combustion, an ignition element to cause ignition of the fuel emitted from the apertures of the burner tube, a flame sensor to detect the presence of a flame associated with the combustion of the fuel emitted from the apertures of the burner tube, and flame sense circuitry including a flame signal accessor to access a flame sense signal from the flame sensor, and a terminal to output an indication of the presence of the flame, the indication of the presence of the flame output without respect to an open or closed state of a lid of the grill.

Example 2 includes the gas grill of example 1, wherein the ignition element is implemented using a spark electrode.

Example 3 includes the gas grill of example 1, wherein the ignition element is implemented using a hot surface ignitor.

Example 4 includes the gas grill of example 1, wherein the flame sense circuitry further includes a filter to apply filtering to the flame sense signal accessed from the flame sensor to create a filtered flame sense signal.

Example 5 includes the gas grill of example 4, wherein the filter is implemented using a high pass filter to filter high frequency electrical noise.

Example 6 includes the gas grill of example 4, further including a comparator to compare the filtered flame sense signal to a threshold to generate the indication of the presence of the flame.

Example 7 includes the gas grill of example 1, wherein to access the flame sense signal, the flame signal accessor is to measure a voltage across the flame sensor and a ground location.

Example 8 includes the gas grill of example 1, wherein to access the flame sense signal, the flame signal accessor is to emit a voltage across the flame sensor and a ground location, and measure an amount of current passing from the flame sensor to the ground location.

Example 9 includes the gas grill of example 8, wherein the burner tube is the ground location.

Example 10 includes the gas grill of example 8, wherein the flame sensor is a first flame sensor, and the ground location is a second flame sensor, the second flame sensor separate from a chassis of the gas grill.

Example 11 includes the gas grill of example 1, wherein the flame sense circuitry further includes a visible indicator implemented using at least one light emitting diode.

Example 12 includes the gas grill of example 1, wherein the flame sense circuitry further includes a communicator to output the indication of the presence of the flame to a central controller.

Example 13 includes the gas grill of example 12, wherein the central controller is to control a position of a valve that is to supply fuel to the burner tube.

Example 14 includes the gas grill of example 1, wherein the ignitor and the flame sensor are grounded through the burner tube.

Example 15 includes the gas grill of example 1, further including an ignitor circuit to provide a voltage to the ignition element to cause the ignition of the fuel.

Example 16 includes the gas grill of example 15, further including a switch to selectively enable one of the ignitor circuit or the flame sense circuitry.

Example 17 includes the gas grill of example 16, wherein the switch is a first switch, and further including a second switch to isolate the flame sensor from the flame sense circuitry when the first switch selectively enables the ignitor circuit.

Example 18 includes the gas grill of example 13, wherein the ignition element is the flame sensor.

Example 19 includes the gas grill of example 1, further including a ceramic harness to position the ignition element and the flame sensor in close proximity to the apertures of the burner tube.

Example 20 includes the gas grill of example 19, wherein the ceramic harness includes a first channel to receive the ignition element and a second channel to receive the flame sensor, the first channel having a first axial length shorter than a second axial length of the second channel.

Example 21 includes the gas grill of example 20, wherein the flame sensor is implemented by a rod having a portion that is bent relative to the second channel of the ceramic harness, the bend of the rod enabling at least a portion of the flame sensor to be positioned directly over the apertures of the burner tube.

Example 22 includes a flame sense circuit for use in a gas grill, the flame sense circuit comprising a flame signal accessor to access a flame sense signal from a flame sensor, a comparator to compare the flame sense signal to a threshold to generate an indication of the presence of the flame, and an indicator to output the indication of the presence of the flame.

Example 23 includes the flame sense circuit of example 22, wherein the comparator is implemented using a microcontroller.

Example 24 includes the flame sense circuit of example 22, further including a filter to apply filtering to the flame sense signal accessed from the flame sensor to create a filtered flame sense signal, wherein the comparator is to compare the filtered flame sense signal to the threshold to generate the indication of the presence of the flame.

Example 25 includes the flame sense circuit of example 24, wherein the filter is implemented using a high pass filter.

Example 26 includes the flame sense circuit of example 24, wherein the filter is implemented using a low pass filter to filter high frequency noise associated with wind affecting the ability to sense the presence of the flame.

Example 27 includes the flame sense circuit of example 22, further including the flame sensor, wherein the flame sensor is implemented using a conductive rod.

Example 28 includes the flame sense circuit of example 22, further including a communicator to output the indication of the presence of the flame to a central controller.

Example 29 includes at least one non-transitory computer readable medium comprising instructions that, when executed, cause at least one processor to at least access a flame sense signal from a flame sensor, compare the flame sense signal to a threshold to generate an indication of the presence of the flame, and output the indication of the presence of the flame.

Example 30 includes the at least one non-transitory computer readable medium of example 29, wherein the instructions, when executed, cause the at least one processor to filter the flame sense signal to create a filtered flame sense signal, wherein the comparison of the flame sense signal to the threshold is based on the filtered flame sense signal.

Example 31 includes the at least one non-transitory computer readable medium of example 29, wherein the instructions, when executed, cause the at least one processor to at least disable an ignitor circuit while the flame sense signal is accessed.

Example 32 includes the at least one non-transitory computer readable medium of example 31, wherein the instructions, when executed, cause the at least one processor to electrically isolate the flame sensor from the ignitor circuit while the ignitor circuit is enabled.

Example 33 includes a method to indicate a presence of a flame, the method comprising accessing a flame sense signal from a flame sensor, comparing the filtered flame sense signal to a threshold to generate an indication of the presence of the flame, and outputting the indication of the presence of the flame.

Example 34 includes the method of example 33, further including filtering the flame sense signal to create a filtered flame sense signal, wherein the comparing of the flame sense signal to the threshold is based on the filtered flame sense signal.

Example 35 includes the method of example 33, further including disabling an ignitor circuit while the flame sense signal is accessed.

Example 36 includes the method of example 35, further including electrically isolating the flame sensor from the ignitor circuit while the ignitor circuit is enabled.

Example 37 includes an apparatus for use in a gas grill, the apparatus comprising means for accessing access a flame sense signal from a flame sensor, means for comparing the flame sense signal to a threshold to generate an indication of the presence of the flame, and means for indicating to output the indication of the presence of the flame.

Example 38 includes the apparatus of example 37, further including means for filtering the flame sense signal accessed from the flame sensor to create a filtered flame sense signal, wherein the means for comparing is to compare the filtered flame sense signal to the threshold to generate the indication of the presence of the flame.

It is noted that this patent claims priority from U.S. Provisional Patent Application No. 62/959,647, which was filed on Jan. 10, 2020, and is hereby incorporated by reference in its entirety.

The following claims are hereby incorporated into this Detailed Description by this reference, with each claim standing on its own as a separate embodiment of the present disclosure.

What is claimed is:

1. A flame sense circuit for use in a gas grill, the flame sense circuit comprising:

flame signal accessor circuitry to access a flame sense signal from a flame sensor, the flame sensor to be electrically isolated from an ignitor circuit while the flame sense signal is accessed;

comparator circuitry to compare the flame sense signal to a threshold to generate an indication of the presence of the flame; and indicator circuitry to output the indication of the presence of the flame.

2. The flame sense circuit of claim 1, wherein the comparator circuitry is implemented using a microcontroller.

3. The flame sense circuit of claim 1, further including a filter to apply filtering to the flame sense signal accessed from the flame sensor to create a filtered flame sense signal, wherein the comparator circuitry is to compare the filtered flame sense signal to the threshold to generate the indication of the presence of the flame.

4. The flame sense circuit of claim 3, wherein the filter is implemented using a high pass filter.

5. The flame sense circuit of claim 3, wherein the filter is implemented using a low pass filter to remove high frequency noise associated with wind affecting the ability to sense the presence of the flame.

6. The flame sense circuit of claim 1, further including the flame sensor, wherein the flame sensor is implemented using a conductive rod.

7. The flame sense circuit of claim 1, further including communicator circuitry to output the indication of the presence of the flame to a central controller.

8. At least one non-transitory computer readable medium comprising instructions that, when executed, cause at least one processor to at least:

electrically isolate a flame sensor from an ignitor circuit while the ignitor circuit is enabled;

access a flame sense signal from the flame sensor;

compare the flame sense signal to a threshold to generate an indication of the presence of the flame; and output the indication of the presence of the flame.

9. The at least one non-transitory computer readable medium of claim 8, wherein the instructions, when executed, cause the at least one processor to filter the flame sense signal to create a filtered flame sense signal, wherein the comparison of the flame sense signal to the threshold is based on the filtered flame sense signal.

10. The at least one non-transitory computer readable medium of claim 8, wherein the instructions, when executed, cause the at least one processor to at least disable an ignitor circuit while the flame sense signal is accessed.

11. An apparatus for use in a gas grill, the apparatus comprising:
   memory;
   instructions; and
   processor circuitry to execute the instructions to cause the processor circuitry to at least:
      cause a flame sensor to be electrically isolated from an ignitor circuit while the ignitor circuit is enabled;
      access a flame sense signal from the flame sensor;
      compare the flame sense signal to a threshold to generate an indication of the presence of the flame; and
      output the indication of the presence of the flame.

12. The apparatus of claim 11, wherein the processor circuitry is to filter the flame sense signal to create a filtered flame sense signal, wherein the comparison of the flame sense signal to the threshold is based on the filtered flame sense signal.

13. The apparatus of claim 11, wherein the processor circuitry is to disable an ignitor circuit while the flame sense signal is accessed.

* * * * *